US012708927B2

(12) United States Patent
Pittet et al.

(10) Patent No.: US 12,708,927 B2
(45) Date of Patent: Aug. 18, 2026

(54) METHODS FOR PRODUCING OPTICAL EFFECT LAYERS COMPRISING MAGNETIC OR MAGNETIZABLE PIGMENT PARTICLES AND EXHIBITING ONE OR MORE INDICIA

(71) Applicant: SICPA HOLDING SA, Prilly (CH)

(72) Inventors: Hervé Pittet, Châtel-St-Denis (CH); Patrick Veya, Aclens (CH); Mélissa Bersier, Cugy (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 18/842,311

(22) PCT Filed: Feb. 27, 2023

(86) PCT No.: PCT/EP2023/054812
§ 371 (c)(1),
(2) Date: Aug. 28, 2024

(87) PCT Pub. No.: WO2023/161464
PCT Pub. Date: Aug. 31, 2023

(65) Prior Publication Data

US 2025/0187036 A1 Jun. 12, 2025

(30) Foreign Application Priority Data

Feb. 28, 2022 (EP) .................................... 22159126

(51) Int. Cl.
*B05D 5/06* (2006.01)
*B05D 3/00* (2006.01)
(Continued)

(52) U.S. Cl.
CPC ............... *B05D 5/06* (2013.01); *B05D 3/207* (2013.01); *C09D 11/037* (2013.01);
(Continued)

(58) Field of Classification Search
CPC ........... B05D 3/207; B05D 5/06; B05D 5/065
See application file for complete search history.

(56) References Cited

U.S. PATENT DOCUMENTS

| | | | |
|---|---|---|---|
| 2,418,479 | A | 4/1947 | Pratt et al. |
| 2,570,856 | A | 10/1951 | Pratt et al. |

(Continued)

FOREIGN PATENT DOCUMENTS

| | | |
|---|---|---|
| CN | 102529326 | 8/2014 |
| DE | 2006848 | 9/1971 |

(Continued)

OTHER PUBLICATIONS

Hao Qin et al. Effect of substitution on light-curable properties in diphenyl(2,4,6-trimethylbenzoyl)phosphine oxide: DFT and TD-DFT calculations. Materials Today. vol. 35, Jun. 2023, 106071 (Year: 2023).*

(Continued)

*Primary Examiner* — Dah-Wei D. Yuan
*Assistant Examiner* — Kristen A Dagenais
(74) *Attorney, Agent, or Firm* — MUNCY, GEISSLER, OLDS & LOWE, P.C.

(57) ABSTRACT

The invention relates to the field of the protection of security documents such as for example banknotes and identity documents against counterfeit and illegal reproduction. In particular, the present invention provides methods for producing optical effect layers (OELs) exhibiting one or more indicia (×30) on a substrate (×20), said method comprising a step of exposing a coating layer (×10) comprising non-spherical magnetic or magnetizable pigment particles to a magnetic field of a magnetic-field generating device so as to orient at least a part of the magnetic or magnetizable pigment particles; a step of applying a top coating composition on top of the coating layer (×10) and in the form of one
(Continued)

or more indicia (×30), and a step of at least partially curing the coating layer (×10) and the one or more indicia (×30) with a curing unit (×50).

13 Claims, 3 Drawing Sheets

(51) Int. Cl.

| | |
|---|---|
| ***C09D 11/037*** | (2014.01) |
| ***C09D 11/101*** | (2014.01) |
| ***C09D 11/102*** | (2014.01) |
| ***C09D 11/322*** | (2014.01) |
| ***C09D 11/38*** | (2014.01) |
| ***H01F 1/032*** | (2006.01) |

(52) U.S. Cl.

CPC .......... *C09D 11/101* (2013.01); *C09D 11/102* (2013.01); *C09D 11/322* (2013.01); *C09D 11/38* (2013.01); *H01F 1/032* (2013.01)

(56) References Cited

U.S. PATENT DOCUMENTS

| | | | | |
|---|---|---|---|---|
| 3,676,273 | A | 7/1972 | Graves | |
| 3,791,864 | A | 2/1974 | Steingroever | |
| 4,838,648 | A | 6/1989 | Phillips et al. | |
| 5,364,689 | A | 11/1994 | Kashiwagi et al. | |
| 5,630,877 | A | 5/1997 | Kashiwagi et al. | |
| 6,103,361 | A | 8/2000 | Batzar et al. | |
| 6,410,130 | B1 | 6/2002 | Schuhmacher et al. | |
| 6,531,221 | B1 | 3/2003 | Schuhmacher et al. | |
| 6,582,781 | B1 | 6/2003 | Schuhmacher et al. | |
| 6,838,166 | B2 | 1/2005 | Phillips et al. | |
| 8,025,952 | B2 | 9/2011 | Raksha et al. | |
| 8,343,615 | B2 | 1/2013 | Raksha et al. | |
| 10,359,730 | B2 | 7/2019 | Anno et al. | |
| 10,503,091 | B2 | 12/2019 | Tsurumi et al. | |
| 2002/0160194 | A1 | 10/2002 | Phillips et al. | |
| 2004/0009309 | A1 | 1/2004 | Raksha et al. | |
| 2005/0106367 | A1 | 5/2005 | Raksha et al. | |
| 2007/0172261 | A1 | 7/2007 | Raksha et al. | |
| 2013/0084411 | A1 | 4/2013 | Raksha et al. | |
| 2016/0297210 | A1* | 10/2016 | Klemann | B41J 2/2114 |
| 2019/0194416 | A1* | 6/2019 | Raksha | B05D 3/067 |

FOREIGN PATENT DOCUMENTS

| | | | |
|---|---|---|---|
| DE | 102010009977 | 9/2011 | |
| EP | 0406667 | 1/1995 | |
| EP | 0710508 | 5/1996 | |
| EP | 0686675 | 2/1998 | |
| EP | 1710756 | 10/2006 | |
| EP | 1641624 | 4/2008 | |
| EP | 1937415 | 4/2009 | |
| EP | 2157141 | 2/2010 | |
| EP | 1819525 | 3/2010 | |
| EP | 2263806 | 12/2010 | |
| EP | 2263807 | 12/2010 | |
| EP | 2306222 | 4/2011 | |
| EP | 2325677 | 5/2011 | |
| EP | 2484455 | 8/2012 | |
| EP | 2223976 | 9/2012 | |
| EP | 1674282 | 6/2013 | |
| EP | 2402401 | 11/2013 | |
| EP | 2155498 | 3/2014 | |
| EP | 3178569 | 6/2017 | |
| EP | 3224055 | 8/2018 | |
| EP | 3459758 | 3/2019 | |
| EP | 2542421 | 5/2019 | |
| EP | 3170566 | 10/2019 | |
| EP | 3587500 | 1/2020 | |
| WO | 0209002 | 1/2002 | |
| WO | 2002073250 | 9/2002 | |
| WO | 02090002 | 11/2002 | |
| WO | 03000801 | 1/2003 | |
| WO | 2004007095 | 1/2004 | |
| WO | 2005002866 | 1/2005 | |
| WO | 2006061301 | 6/2006 | |
| WO | 2006063926 | 6/2006 | |
| WO | 2007131833 | 11/2007 | |
| WO | 2008046702 | 4/2008 | |
| WO | 2010058026 | 5/2010 | |
| WO | 2011012520 | 2/2011 | |
| WO | 2011092502 | 8/2011 | |
| WO | 2012104098 | 8/2012 | |
| WO | 2013167425 | 11/2013 | |
| WO | 2014108303 | 7/2014 | |
| WO | 2014108404 | 7/2014 | |
| WO | 2014198905 | 12/2014 | |
| WO | 2015082344 | 6/2015 | |
| WO | 2015086257 | 6/2015 | |
| WO | 2015121028 | 8/2015 | |
| WO | 2016026896 | 2/2016 | |
| WO | 2016193252 | 12/2016 | |
| WO | 2017064052 | 4/2017 | |
| WO | 2017080698 | 5/2017 | |
| WO | 2017148789 | 9/2017 | |
| WO | 2018019594 | 2/2018 | |
| WO | 2018033512 | 2/2018 | |
| WO | 2018045230 | 3/2018 | |
| WO | 2018054819 | 3/2018 | |
| WO | 2018141547 | 8/2018 | |
| WO | 2019103937 | 5/2019 | |
| WO | 2019215148 | 11/2019 | |
| WO | 2020006286 | 1/2020 | |
| WO | 2020025218 | 2/2020 | |
| WO | 2020025482 | 2/2020 | |
| WO | 2020052862 | 3/2020 | |
| WO | 2020148076 | 7/2020 | |
| WO | 2020160993 | 8/2020 | |
| WO | WO-2020169316 A1 * | 8/2020 | B42D 25/378 |
| WO | 2020193009 | 10/2020 | |
| WO | 2021083808 | 5/2021 | |
| WO | 2021083809 | 5/2021 | |
| WO | 2021239607 | 12/2021 | |
| WO | 2021259527 | 12/2021 | |

OTHER PUBLICATIONS

Aldrich Polymer Produces Application & Reference Information. Photoinitiators: Classifications. Jan. 19, 2022 (Year: 2022).*

P.V. Raje and N.C. Murmu, International Journal of Emerging Technology and Advanced Engineering, (2014), 4(5), pp. 174-183.

F. C. Krebs, Solar Energy Materials & Solar Cells (2009), 93, p. 405-406.

F. C. Krebs, Solar Energy Materials & Solar Cells (2009), 93, p. 407.

N. J. Wilkinson et al., "A review of aerosol jet printing—a non-traditional hybrid process for micro-manufacturing", The International Journal of Advanced Manufacturing Technology (2019) 105:4599-4619.

Z.Q. Zhu and D. Howe (Halbach permanent magnet machines and applications: a review, IEE. Proc. Electric Power Appl., 2001, 148, p. 299-308).

International Search Report and Written Opinion issued with respect to application No. PCT/EP2023/054812.

* cited by examiner

METHODS FOR PRODUCING OPTICAL EFFECT LAYERS COMPRISING MAGNETIC OR MAGNETIZABLE PIGMENT PARTICLES AND EXHIBITING ONE OR MORE INDICIA

FIELD OF THE INVENTION

The present invention relates to the field of methods for producing optical effect layers (OELs) comprising magnetically oriented non-spherical magnetic or magnetizable pigment particles. In particular, the present invention provides methods for magnetically orienting non-spherical magnetic or magnetizable pigment particles in coating layer so as to produce OELs and the use of said OELs as anti-counterfeit means on security documents or security articles as well as decorative purposes.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Security features, e.g. for security documents, can generally be classified into "covert" security features on the one hand, and "overt" security features on the other hand. The protection provided by covert security features relies on the principle that such features are difficult to detect, typically requiring specialized equipment and knowledge for detection, whereas "overt" security features rely on the concept of being easily detectable with the unaided human senses, e.g. such features may be visible and/or detectable via the tactile sense while still being difficult to produce and/or to copy. However, the effectiveness of overt security features depends to a great extent on their easy recognition as a security feature.

Magnetic or magnetizable pigment particles in printing inks or coatings allow for the production of magnetically induced images, designs and/or patterns through the application of a correspondingly structured magnetic field, inducing a local orientation of the magnetic or magnetizable pigment particles in the not yet hardened (i.e. wet) coating, followed by the hardening of the coating. The result is a fixed and stable magnetically induced image, design or pattern. Materials and technologies for the orientation of magnetic or magnetizable pigment particles in coating compositions have been disclosed for example in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/0009309; EP 0 710 508 A1; WO 2002/09002 A2; WO 2003/000801 A2; WO 2005/002866 A1; WO 2006/061301 A1. In such a way, magnetically induced patterns which are highly resistant to counterfeit can be produced. The security element in question can only be produced by having access to both, the magnetic or magnetizable pigment particles or the corresponding ink, and the particular technology employed to print said ink and to orient said pigment in the printed ink.

With the aim of protecting security documents or articles comprising a magnetically induced image against the premature detrimental influence of soil and/or moisture upon use and time, it has been a practice to apply a protective varnish. Said protective varnishes are applied as continuous layers on top of the already prepared and dried/cured magnetically induced image.

WO 2011/012520 A2 discloses a transfer foil comprising a coating layer having the form of a design, said design comprising oriented optically variable magnetic pigment representing an image, indicium, or a pattern. The transfer foil may further comprise a top coating layer, wherein said top coating layer is applied prior to the application of the layer comprising the optically variable magnetic pigment. The process to produce said transfer foil comprises a) a step of applying the top coating layer, hardening/curing said top coating layer, and b) applying the layer comprising the optically variable magnetic pigments, magnetically orienting the particles and hardening/curing said layer. The disclosed methods are not suitable for producing magnetically induced images required to exhibit personalized variable indicia.

EP 1 641 624 B1, EP 1 937 415 B1 and EP 2 155 498 B1 disclose devices and method for magnetically transferring indicia into a not yet hardened (i.e. wet) coating composition comprising magnetic or magnetizable pigment particles so as to form optical effect layers (OELs). The disclosed methods allow the production of security documents and articles having a customer-specific magnetic design. However, the disclosed magnetic devices are prepared to meet the specific design and cannot be modified if said design is required to change from one article to another one and thus, the methods are not suitable for producing OEL required to exhibit personalized variable indicia.

EP 3 170 566 B1, EP 3 459 758 A1, EP 2 542 421 B1 and WO 2020/148076 A1 disclose different methods for the production of variable indicia on optically variable magnetic ink. However, said methods require the use of special apparatus such as photomask, laser or addressable LED.

With the aim of producing variable information having magnetic properties on security documents or articles, inkjet inks comprising magnetic particles have been developed to allow Magnetic Ink Character Recognition (MICR). However, said inkjet inks face different challenges in particular related to the shelf-life stability of said inks, ink printability, non-homogeneous magnetic inks deposits and printhead clogging. EP 2 223 976 B1 discloses a method for the production of documents comprising a MICR feature, wherein said method comprises a step of applying by inkjet a pattern of a curable ink containing a gellant on a substrate, cooling the ink below the gel temperature of the ink, applying a magnetic material to the ink and finally curing said ink. Alternatively, toner comprising magnetic particles have also been developed and are disclosed for example in U.S. Pat. Nos. 10,503,091 B2 and 10,359,730 B2. However specific dedicated apparatus are required to print those toners.

Therefore, a need remains for methods to produce customized optical effect layers OELs exhibiting one or more indicia in a versatile manner but also on an industrial scale, said optical effects layers exhibiting an eye-catching effect. Furthermore, said methods should be reliable, easy to implement and able to work at a high production speed.

SUMMARY OF THE INVENTION

Accordingly, it is an object of the present invention to overcome the deficiencies of the prior art. This is achieved by the provision of a method for producing an optical effect layer (OEL), said OEL comprising a motif made of at least two areas made of a single applied and cured layer comprising non-spherical magnetic or magnetizable pigment particles and exhibiting one or more indicia (×30) on a substrate (×20), the method comprising the steps of:

In one preferred embodiment, the step b) of applying the top coating composition is carried out by a contactless fluid microdispensing technologies, preferably by an inkjet printing process.

Also described herein are optical effect layers (OELs) produced by the method described herein and security documents as well as decorative elements and objects comprising one or more optical OELs described herein.

Also described herein are methods of manufacturing a security document or a decorative element or object, comprising a) providing a security document or a decorative element or object, and b) providing an optical effect layer (OEL) such as those described herein, in particular such as those obtained by the method described herein, so that it is comprised by the security document or decorative element or object.

The method described herein advantageously allows the production of optical effect layers (OELs) made of a single layer and comprising two or more areas made of a radiation cured coating composition comprising non-spherical magnetic or magnetizable pigment particles, wherein said two or more areas comprise non-spherical magnetic or magnetizable pigment particles oriented according to a different orientation pattern with high resolution, said method not requiring the use of curing units with photomask or laser or addressable LED curing units.

The method described herein advantageously uses two compositions, wherein said two compositions are applied on each other in a wet-on-wet state. In particular, the method according to the invention allows the production of optical effect layers (OELs) exhibiting one or more indicia in a versatile manner, can be easily implemented on an industrial scale at a high production speed. The two compositions used in the method described herein comprise as a first composition, a radically radiation curable coating composition comprising non-spherical magnetic or magnetizable pigment particles which is applied on the substrate (×20) and a top coating composition as second composition which is applied at least partially on top of the radically radiation curable coating composition comprising the pigment particles and partially overlaps (i.e. overlaps in at least one area) said composition and which is applied in the form of the one or more indicia, when said radically radiation curable coating composition is still in a wet, unpolymerized state.

The present invention provides a reliable and easy-to-implement method for producing eye-catching optical effect layers (OELs) exhibiting the one or more indicia described herein. The disclosed methods advantageously allow the production of security documents and articles having a customer-specific magnetic design also exhibiting one or more indicia in a versatile, on-line variation, easy-to-implement and highly reliable way without requiring the customization of the magnetic assemblies used to orient the non-spherical magnetic or magnetizable pigment particles for each variable or personalized indicium and for each and every customer-specific optical effect layers (OELs) and without requiring the use of hardening units with photomasks or addressable LED curing units.

DETAILED DESCRIPTION

Definitions

Figure 1:
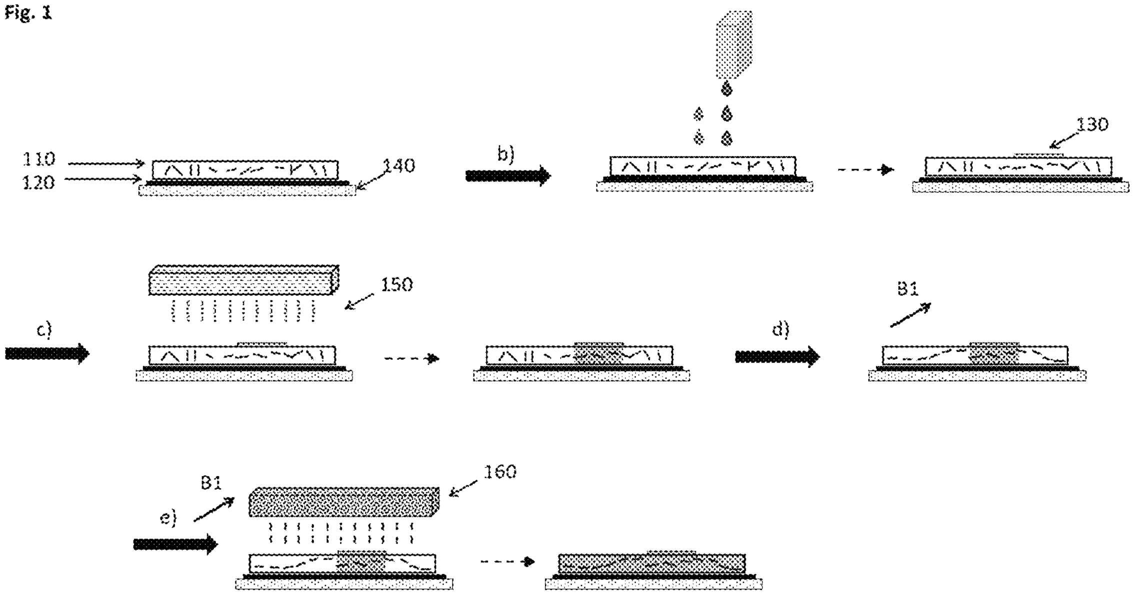
FIG. 1 schematically illustrates a method for producing an optical effect layer (OEL) on a substrate (120) according to the present invention, wherein said method comprises a step b) of applying a top coating composition at least partially on top of a coating layer (110) comprising non-spherical magnetic or magnetizable pigment particles, wherein said top coating composition is applied in the form of one or more indicia (130); subsequently to step b), a step c) of at least partially curing the one or more indicia (130) and the one or more areas of the coating layer (110) below said one or more indicia (130) with a LED curing unit (150); subsequently to step c), a step d) of exposing the coating layer (110) to a magnetic field of a magnetic-field generating device (B1) so as to orient at least a part of the non-spherical magnetic or magnetizable pigment particles in the not yet cured areas of the coating layer (110); and, partially simultaneously with or subsequently to step d) a step e) of at least partially curing the coating layer (110) with a curing unit (160) at least emitting between 250 nm and 320 nm.

The following definitions are to be used to interpret the meaning of the terms discussed in the description and recited in the claims.

As used herein, the term “at least one” is meant to define one or more than one, for example one or two or three.

As used herein, the terms “about” and “substantially” mean that the amount or value in question may be the specific value designated or some other value in its neighborhood. Generally, the terms “about” and “substantially” denoting a certain value is intended to denote a range within ±5% of the value. As one example, the phrase “about 100” denotes a range of 100±5, i.e. the range from 95 to 105. Generally, when the terms “about” and “substantially” are used, it can be expected that similar results or effects according to the invention can be obtained within a range of ±5% of the indicated value.

The terms “substantially parallel” refer to deviating not more than 10° from parallel alignment and the terms “substantially perpendicular” refer to deviating not more than 10° from perpendicular alignment.

As used herein, the term “and/or” means that either all or only one of the elements of said group may be present. For example, “A and/or B” shall mean “only A, or only B, or both A and B”. In the case of “only A”, the term also covers the possibility that B is absent, i.e. “only A, but not B”.

The term “comprising” as used herein is intended to be non-exclusive and open-ended. Thus, for instance a coating composition comprising a compound A may include other compounds besides A. However, the term “comprising” also covers, as a particular embodiment thereof, the more restrictive meanings of “consisting essentially of” and “consisting of”, so that for instance “a fountain solution comprising A, B and optionally C” may also (essentially) consist of A and B, or (essentially) consist of A, B and C.

The term “optical effect layer (OEL)” as used herein denotes a coating layer that comprises oriented magnetic or magnetizable pigment particles, wherein said magnetic or magnetizable pigment particles are oriented by a magnetic field and wherein the oriented magnetic or magnetizable pigment particles are fixed/frozen in their orientation and position (i.e. after curing) so as to form a magnetically induced image.

The term "coating composition" refers to any composition which is capable of forming an optical effect layer (OEL) on a solid substrate and which can be applied preferably but not exclusively by a printing method. The coating composition comprises the non-spherical magnetic or magnetizable pigment particles described herein and the binder described herein. The term "top coating composition" refers to a composition which does not comprise the non-spherical magnetic or magnetizable pigment particles described herein.

As used herein, the term "wet" refers to a coating layer which is not yet cured, for example a coating in which the non-spherical magnetic or magnetizable pigment particles are still able to change their positions and orientations under the influence of external forces acting upon them.

The term "(meth)acrylate" in the context of the present invention refers to the acrylate as well as the corresponding methacrylate.

The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features shall also be deemed as disclosed as long as this combination of "preferred" embodiments/features is technically meaningful.

The present invention provides methods for producing optical effect layers (OELs) exhibiting one or more indicia (×30) on substrates (×20), wherein said OELs are based on magnetically oriented non-spherical magnetic or magnetizable pigment particles and further exhibit one or more indicia (×30).

The method described herein comprises the step a) of applying on the substrate (×20) surface described herein the radically radiation curable coating composition comprising the non-spherical magnetic or magnetizable pigment particles described herein and the one or more photo-reactive compounds not absorbing in a range from about 375 nm to about 470 nm described herein so as to form the coating layer (×10) described herein, said composition being in a first liquid state which allows its application as a layer and which is in a not yet cured (i.e. wet) state wherein the pigment particles can move and rotate within the layer. Since the radically radiation curable coating composition described herein is to be provided on the substrate (×20) surface, the radically radiation curable coating composition comprises at least a binder material and the magnetic or magnetizable pigment particles, wherein said composition is in a form that allows its processing on the desired printing or coating equipment. Preferably, said step a) is carried out by a printing process, preferably selected from the group consisting of screen printing, rotogravure printing, flexography printing, intaglio printing (also referred in the art as engraved copper plate printing, engraved steel die printing), pad printing and curtain coating, more preferably selected from the group consisting of intaglio printing, screen printing, rotogravure printing, pad printing and flexography printing and still more preferably screen printing, rotogravure printing, pad printing and flexography printing. According to a preferred embodiment, the step a) is carried out by a printing process selected from the group consisting of screen printing, rotogravure printing and flexography printing.

The non-spherical magnetic or magnetizable pigment particles described herein are preferably prolate or oblate ellipsoid-shaped, platelet-shaped or needle-shaped magnetic or magnetizable pigment particles or a mixture of two or more thereof and more preferably platelet-shaped particles.

Non-spherical magnetic or magnetizable pigment particles described herein are defined as having, due to their non-spherical shape, non-isotropic reflectivity with respect to an incident electromagnetic radiation for which the cured binder material is at least partially transparent. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the non-spherical magnetic or magnetizable pigment particles described herein have a non-isotropic reflectivity with respect to incident electromagnetic radiation in some parts or in the complete wavelength range of from about 200 to about 2500 nm, more preferably from about 400 to about 700 nm, such that a change of the particle's orientation results in a change of reflection by that particle into a certain direction. As known by the man skilled in the art, the magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation.

The radically radiation curable coating composition described herein as well as the coating layer (×10) described herein comprise the non-spherical, preferably platelet-shaped, magnetic or magnetizable pigment particles described herein preferably in an amount from about 5 wt-% to about 40 wt-%, more preferably about 10 wt-% to about 30 wt-%, the weight percentages being based on the total weight of the radically radiation curable coating composition or the coating layer (×10).

In the OELs described herein, the magnetic or magnetizable pigment particles described herein are dispersed in the radically radiation curable coating composition comprising a cured binder material that fixes the orientation and position of the magnetic or magnetizable pigment particles. The binder material is at least in its cured or solid state (also referred to as second state herein), at least partially transparent to electromagnetic radiation of a range of wavelengths comprised between 200 nm and 2500 nm, i.e. within the wavelength range which is typically referred to as the "optical spectrum" and which comprises infrared, visible and UV portions of the electromagnetic spectrum. Accordingly, the particles contained in the binder material in its cured or solid state and their orientation-dependent reflectivity can be perceived through the binder material at some wavelengths within this range. Preferably, the cured binder material is at least partially transparent to electromagnetic radiation of a range of wavelengths comprised between 200 nm and 800 nm, more preferably comprised between 400 nm and 700 nm. Herein, the term "transparent" denotes that the transmission of electromagnetic radiation through a layer of 20 μm of the cured binder material as present in the OEL (not including the non-spherical magnetic or magnetizable pigment particles, but all other optional components of the OEL in case such components are present) is at least 50%, more preferably at least 60%, even more preferably at least 70%, at the wavelength(s) concerned. This can be determined for example by measuring the transmittance of a test piece of the cured binder material (not including the non-spherical magnetic or magnetizable pigment particles) in accordance with well-established test methods, e.g. DIN 5036-3 (1979-11). If the OEL serves as a covert security feature, then typically technical means will be necessary to detect the (complete) optical effect generated by the OEL under respective illuminating conditions comprising the selected non-visible wavelength; said detection requiring that the wavelength of incident radiation is selected outside the visible range, e.g. in the near UV-range.

Suitable examples of non-spherical, preferably platelet-shaped, magnetic or magnetizable pigment particles described herein include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite ($Fe_2O_3$), magnetite ($Fe_3O_4$), chromium dioxide ($CrO_2$), magnetic ferrites ($MFe_2O_4$), magnetic spinels ($MR_2O_4$), magnetic hexaferrites ($MFe_{12}O_{19}$), magnetic orthoferrites ($RFeO_3$), magnetic garnets $M_3R_2(AO_4)_3$, wherein M stands for two-valent metal, R stands for three-valent metal, and A stands for four-valent metal.

Examples of non-spherical, preferably platelet-shaped, magnetic or magnetizable pigment particles described herein include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride ($MgF_2$), silicon oxide (SiO), silicon dioxide ($SiO_2$), titanium oxide ($TiO_2$), and aluminum oxide ($Al_2O_3$), more preferably silicon dioxide ($SiO_2$); or layers B independently made from one or more selected from the group consisting of metals and metal alloys, preferably selected from the group consisting of reflective metals and reflective metal alloys, and more preferably selected from the group consisting of silver (Ag), aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

The radically radiation curable coating composition described herein may comprise non-spherical, preferably platelet-shaped, optically variable magnetic or magnetizable pigment particles, and/or non-spherical, preferably platelet-shaped, magnetic or magnetizable pigment particles having no optically variable properties. Preferably, at least a part of the magnetic or magnetizable pigment particles described herein is constituted by non-spherical, preferably platelet-shaped, optically variable magnetic or magnetizable pigment particles. In addition to the overt security provided by the color shifting property of the optically variable magnetic or magnetizable pigment particles, which allows easily detecting, recognizing and/or discriminating an article or security document carrying an ink, coating composition, or coating layer comprising the optically variable magnetic or magnetizable pigment particles described herein from their possible counterfeits using the unaided human senses, the optical properties of the optically variable magnetic or magnetizable pigment particles may also be used as a machine readable tool for the recognition of the OEL. Thus, the optical properties of the optically variable magnetic or magnetizable pigment particles may simultaneously be used as a covert or semi-covert security feature in an authentication process wherein the optical (e.g. spectral) properties of the pigment particles are analyzed and thus increase the counterfeiting resistance.

The use of non-spherical, preferably platelet-shaped, optically variable magnetic or magnetizable pigment particles in coating layers for producing an OEL enhances the significance of the OEL as a security feature in security document applications, because such materials are reserved to the security document printing industry and are not commercially available to the public.

As mentioned above, preferably at least a part of the non-spherical, preferably platelet-shaped, magnetic or magnetizable pigment particles is constituted by non-spherical, preferably platelet-shaped, optically variable magnetic or magnetizable pigment particles. These are more preferably selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 B1; WO 2019/103937 A1; WO 2020/006286 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure and/or pigment particles having a multilayer structure combining one or more multilayer Fabry-Perot structures.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of absorber/dielectric/reflector/magnetic/dielectric/absorber multilayer structures.

Preferred seven-layer Fabry Perot multilayer structures consist of structures such as absorber/dielectric/reflector/magnetic/reflector/dielectric/absorber multilayer disclosed in U.S. Pat. No. 4,838,648.

Preferred pigment particles having a multilayer structure combining one or more Fabry-Perot structures are those described in WO 2019/103937 A1 and consist of combinations of at least two Fabry-Perot structures, said two Fabry-Perot structures independently comprising a reflector layer, a dielectric layer and an absorber layer, wherein the reflector and/or the absorber layer can each independently comprise one or more magnetic materials and/or wherein a magnetic layer is sandwich between the two structures. WO 2020/006/286 A1 and EP 3 587 500 A1 disclose further preferred pigment particles having a multilayer structure.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g. $Na_3AlF_6$), neodymium fluoride ($NdF_3$), samarium fluoride ($SmF_3$), barium fluoride ($BaF_2$), calcium fluoride ($CaF_2$), lithium fluoride (LiF), and metal oxides such as silicon oxide (SiO), silicium dioxide ($SiO_2$), titanium oxide ($TiO_2$), aluminum oxide ($Al_2O_3$), more preferably selected from the group consisting of magnesium fluoride ($MgF_2$) and silicon dioxide ($SiO_2$) and still more preferably magnesium fluoride ($MgF_2$). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co). When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a $Cr/MgF_2/Al/Ni/Al/MgF_2/Cr$ multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures, seven-layer Fabry-Perot multilayer structures and pigment particles having a multilayer structure combining one or more multilayer Fabry-Perot structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 B1 whose content is hereby incorporated by reference in its entirety.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and colorshifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence $A^1/B/A^2$, wherein $A^1$ and $A^2$ may be identical or different and each comprises at least one cholesteric layer, and B is an interlayer absorbing all or some of the light transmitted by the layers $A^1$ and $A^2$ and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigment particles comprising one or more magnetic materials include without limitation structures consisting of a substrate selected from the group consisting of a core coated with one or more layers, wherein at least one of the core or the one or more layers have magnetic properties. For example, suitable interference coated pigment particles comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides ($SiO_2$), aluminum oxides ($Al_2O_3$), titanium oxides ($TiO_2$), graphites and mixtures of two or more thereof. Furthermore, one or more additional layers such as coloring layers may be present.

The non-spherical, preferably platelet-shaped, magnetic or magnetizable pigment particles described herein preferably have a size d50 between about 2 μm and about 50 μm (as measured by direct optical granulometry).

The non-spherical, preferably platelet-shaped, magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

As mentioned herein, the method described herein comprises the step c) and e) of at least partially curing the coating layer (×10) to a second state so as to fix the magnetic or magnetizable pigment particles in their adopted positions and orientations. The first liquid state of the radically radiation curable coating composition wherein the magnetic or magnetizable pigment particles can move and rotate and the second state wherein the magnetic or magnetizable pigment particles are fixed are provided by using a certain type of radically radiation curable coating composition. For example, the components of the radically radiation curable coating composition other than the non-spherical magnetic or magnetizable pigment particles may take the form of an ink or radically radiation curable coating composition such as those which are used in security applications, e.g. for banknote printing. The aforementioned first and second states are provided by using a material that shows an increase in viscosity in reaction to an exposure to an electromagnetic radiation. That is, when the fluid binder material is cured or solidified, said binder material converts into the second state, where the non-spherical magnetic or magnetizable pigment particles are fixed in their current positions and orientations and can no longer move nor rotate within the binder material. As used herein, by "at least partially curing the coating layer (×10)", it means that the non-spherical, preferably platelet-shaped, magnetic or magnetizable pigment particles are fixed/frozen in their adopted positions and orientations and cannot move and rotate anymore (also referred in the art as "pinning" of the particles).

The radically radiation curable coating composition used to produce the coating layer (×10) described herein comprises the non-spherical, preferably platelet-shaped, magnetic or magnetizable pigment particles described herein and the one or more compounds not absorbing in a range from about 375 nm to about 470 nm described herein. Radiation curing, in particular UV-Vis curing, advantageously leads to an instantaneous increase in viscosity of the coating composition after exposure to the irradiation, thus preventing any further movement of the pigment particles and in consequence any loss of information after the magnetic orientation step.

The radically radiation curable coating composition comprising the non-spherical, preferably platelet-shaped, magnetic or magnetizable pigment particles described herein and the one or more photo-reactive compounds not absorbing in a range from about 375 nm to about 470 nm described herein is a radically curable composition. In other words, the radically radiation curable coating composition, preferably the UV-Vis curable coating composition, comprises monomers and/or oligomers being radically curable compounds.

Radically curable compositions comprise one or more radically curable compounds which are cured by free radical mechanisms consisting of the activation by energy of one or more photoinitiators which liberate free radicals which in turn initiate the polymerization so as to form a binder. Preferably, the radically curable compounds are selected from (meth)acrylates, preferably selected from the group consisting of epoxy (meth)acrylates, (meth)acrylated oils, polyester and polyether (meth)acrylates, aliphatic or aromatic urethane (meth)acrylates, silicone (meth)acrylates, acrylic (meth)acrylates and mixtures thereof.

The radically radiation curable coating composition described herein preferably comprises one or more radically curable oligomers and one or more radically curable monomers selected from the group consisting of tri(meth)acrylates, tetra(meth)acrylates and mixtures thereof and optionally one or more reactive diluents being radically curable monomers selected from the group consisting of mono (meth)acrylates, di(meth)acrylates and mixtures thereof.

According to one embodiment, the radically radiation curable coating composition preferably comprises the one or more radically curable oligomers described herein in an amount from about 25wt-% to about 55 wt-% and the one or more radically curable monomers described herein in an amount from about 10 wt-% to about 50 wt-% and optionally up to about 50 wt-% of the one or more reactive diluents described herein, the wt-% being based on the total weight of the coating composition.

Radically curable oligomers as used herein refers to relatively high molecular weight oligomeric compounds having a weight average molecular weight (MW)≥500 g/mol. The radically curable oligomers described herein are preferably (meth)acrylate oligomers which may be branched or essentially linear, and the (meth)acrylate functional group or groups, respectively, can be terminal groups and/or pendant side groups bonded to the oligomer backbone. The term "(meth)acrylate" in the context of the present invention refers to the acrylate as well as the corresponding methacrylate. Preferably, the radically curable oligomers are (meth) acrylic oligomers, urethane (meth)acrylate oligomers, polyester (meth)acrylate oligomers, polyether based (meth) acrylate oligomers, epoxy (meth)acrylate oligomers, and mixtures thereof, more preferably selected from the group consisting of epoxy (meth)acrylate oligomers, and mixtures thereof. The functionality of the oligomer is not limited but is preferably not greater than 3.

Suitable examples of epoxy (meth)acrylate oligomer include without limitation aliphatic epoxy (meth)acrylate oligomers, in particular mono(meth)acrylates, di(meth)acrylates and tri(meth)acrylates, and aromatic epoxy (meth) acrylate oligomers. Suitable examples of aromatic epoxy (meth)acrylate oligomers include bisphenol-A (meth)acrylate oligomers such as bisphenol-A mono(meth)acrylates, bisphenol-A di(meth)acrylates and bisphenol-A tri(meth) acrylates as well as alkoxylated (such as for example ethoxylated and propoxylated) bisphenol-A (meth)acrylate oligomers such as for example alkoxylated bisphenol-A mono(meth)acrylates, alkoxylated bisphenol-A di(meth) acrylates and alkoxylated bisphenol-A tri(meth)acrylates, preferably alkoxylated bisphenol-A di(meth)acrylates. Particularly suitable epoxy (meth)acrylate oligomers are sold by Allnex under the designation EBECRYL® 2959.

The one or more tri(meth)acrylates described herein are preferably selected from the group consisting of trimethylolpropane triacrylates, trimethylolpropane trimethacrylates, alkoxylated (in particular ethoxylated or propoxylated) trimethylolpropane triacrylates, alkoxylated (in particular ethoxylated or propoxylated) trimethylolpropane trimethacrylates, alkoxylated (in particular ethoxylated or propoxylated) glycerol triacrylates, pentaerythritol triacrylates, alkoxylated (in particular ethoxylated or propoxylated) pentaerythritol triacrylates and mixtures thereof, preferably selected from the group consisting of trimethylolpropane triacrylates, alkoxylated (in particular ethoxylated or propoxylated) trimethylolpropane triacrylates, alkoxylated (in particular ethoxylated or propoxylated) glycerol triacrylates, pentaerythritol triacrylates and mixtures thereof. Particularly suitable trimethylolpropane triacrylates (CAS. 15625-89-5) are sold by Allnex under the designation TMPTA, by Rahn under the designation Miramer M300 or by Sartomer under the designation SR351.

The one or more tetra(meth)acrylates described herein are selected from ditrimethylolpropane tetra(meth)acrylates, pentaerythritol tetra(meth)acrylates, alkoxylated (such as for example ethoxylated and propoxylated) pentaerythritol tetra (meth)acrylates and mixtures thereof, preferably selected from the group consisting of ditrimethylolpropane tetra (meth)acrylates, alkoxylated pentaerythritol tetra(meth) acrylates, as well as mixtures thereof.

The radically radiation curable coating composition described herein may further comprise 0-50 wt-%, preferably 0-40% and more preferably 0-30% of the one or more reactive diluents described therein and being preferably selected from mono(meth)acrylates, di(meth)acrylates and mixtures thereof, the weight percent being based on the total weight of the radically radiation curable coating composition.

Suitable mono(meth)acrylates may be selected from alkyl (meth)acrylates, cycloalkyl (meth)acrylates, benzyl (meth) acrylates, phenyl (meth)acrylates (including phenoxyalkyl (meth)acrylates such as phenoxyethyl acrylate), cyclic trimethylolpropane formal acrylate, tetrahydrofurfuryl acrylate, aliphatic urethane (meth)acrylates and alkoxylated (in particular ethoxylated or propoxylated) compounds thereof.

Suitable di(meth)acrylates include without limitation ethylene glycol diacrylate, ethylene glycol dimethacrylate; 1,4-butanediol diacrylate, 1,4-butanediol dimethacrylate; 1,3-butanediol diacrylate, 1,3-butanediol dimethacrylate; 2-methyl-1,3-propanediol diacrylate, 3-methyl-1,5-pentanediol diacrylate); 2-butyl-2-ethyl-1,3-propanediol diacrylate, 1,6-hexanediol diacrylate, 1,6-hexanediol dimethacrylate; neopentyl glycol diacrylate, neopentyl glycol dimethacrylate; 1,9-nonanediol diacrylate; 1,9-nonanediol dimethacrylate; 1,10-decaanediol diacrylate, 1,10-decaanediol dimethacrylate, alkoxylated (in particular ethoxylated and propoxylated) 1,6-hexanediol diacrylates; propoxylated neopentyl glycol diacrylate; ethoxylated 2-methyl-1,3-propanediol diacrylate; tricyclodecanedimethanol diacrylate); diethylene glycol diacrylate, diethylene glycol dimethacrylate; dipropylene glycol diacrylate; triethylene glycol diacrylate, triethylene glycol dimethacrylate; tripropylene glycol diacrylate; tripropylene glycol dimethacrylate, tetraethylene glycol diacrylate, tetraethylene glycol dimethacrylate; polyethylene glycol 200/400/600 diacrylates, polyethylene glycol 200/400/600 dimethacrylate; ethoxylated (EO2/EO3/EO4/EO10) bisphenol A diacrylates, and ethoxylated (EO2/EO3/EO4/EO10) bisphenol A dimethacrylate. A particularly suitable tripropylene glycol diacrylate (CAS 42978-66-5) is sold by Allnex under the designation TPGDA.

The radically radiation curable coating composition comprising the non-spherical, preferably platelet-shaped, magnetic or magnetizable pigment particles described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The radically radiation curable coating composition comprising the non-spherical, preferably platelet-shaped, magnetic or magnetizable pigment particles described herein may further comprise one or more marker substances or taggants and/or one or more machine readable materials selected from the group consisting of magnetic materials (different from the magnetic or magnetizable pigment particles described herein), luminescent materials, electroluminescent materials, upconverting materials, electrically conductive materials and infrared-absorbing materials. As used herein, the term "machine readable material" refers to a material which exhibits at least one distinctive property which is detectable by a device or a machine, and which can be comprised in a coating so as to confer a way to authenticate said coating or article comprising said coating by the use of a particular equipment for its detection and/or authentication.

Preferably, the radically radiation curable coating composition described herein is characterized by a viscosity of between about 200 mPas and about 1500 mPas at 25° C. as measured using a Brookfield viscometer (model "DV-I Prime) equipped with a spindle S27 at 100 rpm.

The radically radiation curable coating compositions described herein may be prepared by dispersing or mixing the magnetic or magnetizable pigment particles described herein and the one or more additives when present in the presence of the binder material described herein thus forming liquid compositions. When present, the one or more photoinitiators may be added to the composition either during the dispersing or mixing step of all other ingredients or may be added at a later stage, i.e. after the formation of the liquid coating composition.

The method described herein further comprises, subsequently to the step a) described herein, the step b) of applying the top coating composition described herein at least partially on top of the coating layer (×10) described herein. The top coating composition described herein is applied in the form of the one or more indicia (×30) described herein and partially overlaps (i.e. overlaps in at least one area) the coating layer (×10) described herein, wherein the radically radiation curable coating composition of the coating layer (×10) is still in a wet and unpolymerized state and the magnetic or magnetizable pigment particles are freely movable and rotatable.

As used herein, the term "indicia" shall mean continuous and discontinuous layers consisting of distinguishing markings or signs or patterns. Preferably, the one or more indicia (×30) described herein are selected from the group consisting of codes, symbols, alphanumeric symbols, motifs, geometric patterns (e.g. circles, triangles and regular or irregular polygons), letters, words, numbers, logos, drawings, portraits and combinations thereof. Examples of codes include encoded marks such as an encoded alphanumeric data, a one-dimensional barcode, a two-dimensional barcode, a QR-code, datamatrix and IR-reading codes. The one or more indicia (×30) described herein may be solids indicia and/or raster indicia.

The top coating composition described herein is applied in the form of the one or more indicia described herein (×30) by an application process preferably a contactless fluid microdispensing process, more preferably selected from the group consisting of spray coating, aerosol jet printing, electrohydrodynamic printing, slot die coating and inkjet printing, still more preferably by an inkjet printing process, wherein said contactless fluid microdispensing printing processes are variable information printing methods allowing for the unique production of the one or more indicia (x30) on or in the optical effect layers (OELs) described herein. The application process is chosen as a function of the design and resolution of the one or more indicia to be produced.

Inkjet printing might be advantageously used for producing optical effect layers (OELs) exhibiting the one or more indicia described herein comprising variable halftones. Inkjet halftone printing is a reprographic technique that simulates continuous-tone imagery, comprising an infinite number of colors or greys, by the application of variable inkjet deposits or grammages.

Spray coating is a technique involving forcing the composition through a nozzle whereby a fine aerosol is formed. A carrier gas and electrostatic charging may be involved to aid in directing the aerosol at the surface that is to be printed. Spray printing allows to print spots and lines. Suitable compositions for spray printing typically have a viscosity between about 10 mPa·s and about 1 Pa·s (15° C., 1000 $s^{-1}$). Resolution of spray coating printing lies in the millimeter range. Spray printing is described for example in F. C. Krebs, Solar Energy Materials & Solar Cells (1009), 93, page 407.

Aerosol jet printing (AJP) is an emerging contactless direct write approach aimed at the production of fine features on a wide range of substrates. AJP is compatible with a wide material range and freeform deposition, allows high resolution (in the order of about 10 micrometers) coupled with a relatively large stand-off distance (e.g. 1-5 mm), in addition to the independence of orientation. The technology involves aerosol generation using either ultrasonic or pneumatic atomizer to generate an aerosol from compositions typically having a viscosity between about 1 mPa·s and about 1 Pa·s (15° C., 1000 $s^{-1}$). Aerosol jet printing is described for example in N. J. Wilkinson et al., The International Journal of Advanced Manufacturing Technology (1019) 105:4599-4619.

Electrohydrodynamic inkjet printing is a high resolution inkjet printing technology. Electrohydrodynamic inkjet printing technology makes use of externally applied electric fields to manipulate droplets sizes, ejection frequencies and placement on the substrate to get higher resolution than convention inkjet printing, while keeping a high production speed. The resolution of electrohydrodynamic inkjet printing is about two orders of magnitude higher than conventional inkjet printing technology; thus, it can be used for the orienting of nano- and micro-scale patterns. Electrohydrodynamic inkjet printing may be used both in DOD or in continuous mode. Compositions for electrohydrodynamic inkjet printing typically have a viscosity between about 1 mPa·s and about 1 Pa·s (15° C., 1000 $s^{-1}$). Electrohydrodynamic inkjet printing technology is described for example P. V. Raje and N. C. Murmu, International Journal of Emerging Technology and Advanced Engineering, (1014), 4(5), pages 174-183.

Slot die-coating is a 1-dimensional coating technique. Slot-die coating allows for the coating of stripes of material which is well suited for making a multilayer coating with stripes of different materials layered on top of each other. The alignment of the pattern is produced by the coating head being translated along the direction perpendicular to the direction of the web movement. A slot die-coating head comprises a mask that defines the slots of the coating head through which the slot-die coating ink is dispersed. An example of a slot-die coating head is illustrated in F. C. Krebs, Solar Energy Materials & Solar Cells (1009), 93, page 405-406. Suitable compositions for slot die-coating typically have a viscosity between about 1 mPa·s and about 20 mPa·s (15° C., 1000 $s^{-1}$).

According to one embodiment, the top coating composition described herein is printed in the form of the one or more indicia (x30) described herein by an inkjet printing process, preferably a continuous inkjet (CI) printing process or a drop-on-demand (DOD) inkjet printing process, more preferably a drop-on-demand (DOD) inkjet printing process. Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet, valve jet (viscosity between about 1 mPa·s and about 1 Pa·s (15° C., 1000 $s^{-1}$)) and electrostatic process.

The top coating composition described herein comprises one or more radically curable compounds selected from the group consisting of mono(meth)acrylates, di(meth)acrylates, tri(meth)acrylates such as those described herein, tetra(meth)acrylates such as those described herein and mixtures thereof.

According to one embodiment, the top coating composition described herein comprises one or more monomers and/or oligomers being radically curable compounds such as those described herein for the radically radiation curable coating composition comprising the magnetic or magnetizable pigment particles described herein. For embodiments wherein the top coating composition is applied by an inkjet printing process, said top coating composition may further comprises conventional additives and ingredients such as for example wetting agents, antifoams, surfactants, (co-)solvents and mixtures thereof that are used in the field of radiation curable inkjet.

The top coating composition described herein may further comprise the one or more marker substances or taggants and/or the one or more machine readable materials such as those described for the radically radiation curable coating composition comprising the non-spherical magnetic or magnetizable pigment particles described herein, provided that the size of said substances, taggants, or machine readable materials is suitable for the application process described herein.

The methods for producing of the optical effect layers (OELs) exhibiting the one or more indicia (x30) thereof comprising the step of at least partially curing the one or more indicia (x30) and the one or more areas of the coating layer (x10) below said one or more indicia (x30) with the LED curing unit (x50) and the step of at least partially curing the coating layer (x10) with a curing unit (x60) at least emitting between 250 nm and 320 nm require specific combinations to allow the selective curing of the one or more indicia (x30) and coating layer (x10) at different stages of the method. Therefore, the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) are selected according to one of the combinations described in the following embodiments.

According to a 1$^{st}$ embodiment, the one or more photo-reactive compounds not absorbing in the range from about 375 nm to about 470 nm of the radically radiation curable coating composition of step a) are alpha-hydroxyketones, preferably selected from the group consisting of 2-hydroxy-2-methylpropiophenone (CAS 7473-98-5 sold for example by IGM Resins under the name Omnirad 1173); 2-hydroxy-4'-hydroxyethoxy-2-methylpropiophenone (CAS 106797-53-9, sold for example by IGM Resins under the name Omnirad 2959); 2-hydroxy-1-[4-[4-(1-hydroxy-2-methylpropanoyl)phenoxy]phenyl]-2-methylpropan-1-one (CAS 474510-57-1, sold for example by IGM Resins under the name Omnirad 127); (1-hydroxycyclohexyl)phenylmethanone (CAS 947-19-3, sold for example by IGM Resins under the name Omnirad 481); 2-hydroxy-1-[4-[4-(1-hydroxy-2-methylpropanoyl)phenoxy]phenyl]-2-methylpropan-1-one (CAS 71868-15-0, sold for example by IGM Resins under the name ESACURE KIP 160); 1-[2,3-dihydro-1-[4-(1-hydroxy-2-methyl-1-oxopropyl)phenyl]-1,3,3-trimethyl-1H-inden-5-yl]-2-hydroxy-2-methyl-1-propanone (CAS 135452-43-6); ar-(1-hydroxy-2-methyl-1-oxopropyl) (1-methylethenyl)-benzene homopolymer (CAS 163702-01-0, sold for example by IGM Resins under the name ESACURE KIP 150); α-(1,1-dimethyl-2-oxo-2-phenylethyl)-ω-hydroxy-poly(oxy-1,2-ethanediyl) (9CI) (CAS 554449-21-7, sold for example by Double Bond Chemical under the name DoubleCure® 73W); polymeric alpha-hydroxy-ketone (CAS 1842314-75-3, sold for example by DoubleBond under the name CHIVACURE® 300). More preferably, the alpha-hydroxyketones of the radically radiation curable coating composition of step a) of said 1$^{st}$ embodiment are selected from the group consisting of 2-hydroxy-2-methylpropiophenone (CAS 7473-98-5); 2-hydroxy-4'-hydroxyethoxy-2-methylpropiophenone (CAS 106797-53-9); 2-hydroxy-1-[4-[4-(1-hydroxy-2-methylpropanoyl)phenoxy]phenyl]-2-methylpropan-1-one (CAS 474510-57-1); (1-hydroxycyclohexyl)phenylmethanone (CAS 947-19-3); 2-hydroxy-1-[4-[4-(1-hydroxy-2-methylpropanoyl)phenoxy]phenyl]-2-methylpropan-1-one (CAS 71868-15-0); 1-[2,3-dihydro-1-[4-(1-hydroxy-2-methyl-1-oxopropyl)phenyl]-1,3,3-trimethyl-1H-inden-5-yl]-2-hydroxy-2-methyl-1-propanone (CAS 135452-43-6); ar-(1-hydroxy-2-methyl-1-oxopropyl) (1-methylethenyl)-benzene homopolymer (CAS 163702-01-0); and mixtures thereof. Still preferably, the alpha-hydroxyketones of the radically radiation curable coating composition of step a) of said 1$^{st}$ embodiment are selected from the group consisting of 2-hydroxy-2-methylpropiophenone (CAS 7473-98-5); 2-hydroxy-4'-hydroxyethoxy-2-methylpropiophenone (CAS 106797-53-9); and mixtures thereof.

According to said 1$^{st}$ embodiment, the one or more compounds absorbing in the range from about 375 nm to about 470 nm of the top curable coating composition of step b) are selected from the group consisting of acyl phosphine oxide compounds, alpha-amino-ketone compounds, mixtures of one or more benzophenone compounds (being different from those of the radically radiation curable coating composition of step a)) and one or more amine compounds, glyoxylate compounds (optionally with one or more amine compounds), benzyl ketal compounds (being different from those of the radically radiation curable coating composition of step a)), oxime ester compounds, titanocene compounds, mixtures of one or more thioxanthone compounds and one or more amine compounds, mixtures of one or more coumarin compounds and one or more amine compounds, mixtures of one or more camphorquinone compounds and one or more amine compounds; and mixtures thereof.

Preferably, the acyl phosphine oxide compounds are selected from the group consisting of (1,4,6-trimethylbenzoyl) diphenylphosphine oxide (CAS 75980-60-8, sold for example by IGM Resins under the name Omnirad TPO); 2,4,6-trimethylbenzoyl-ethoxylphenylphosphine oxide (CAS 84434-11-7, sold for example by IGM Resins under the name Omnirad TPO-L); phenylbis(2,4,6-trimethylbenzoyl)phosphine oxide (CAS 162881-26-7, sold for example by IGM Resins under the name Omnirad 819); bis(1,6-dimethoxybenzoyl)(1,4,4-trimethylpentyl)phosphine oxide (CAS 145052-34-2, sold for example by IGM Resins under the name Omnirad 403); ethyl (3-benzoyl-2,4,6-trimethylbenzoyl)(phenyl)phosphinate (CAS 1539267-56-5, sold for example by Lambson under the name SpeedCure XKm); α,α',α''-1,2,3-propanetriyltris[ω-[[phenyl(1,4,6-trimethylbenzoyl)phosphinyl]oxy]-poly(oxy-1,2-ethanediyl) (CAS 1834525-17-5, sold for example by Rahn under the name Omnipol TP); and mixtures thereof. More preferably the acyl phosphine oxide compounds are selected from the group consisting of 2,4,6-trimethylbenzoyl-ethoxylphenylphosphine oxide (CAS 84434-11-7); phenylbis(2,4,6-trimethylbenzoyl)phosphine oxide (CAS 162881-26-7); bis (1,6-dimethoxybenzoyl)(1,4,4-trimethylpentyl)phosphine oxide (CAS 145052-34-2); ethyl (3-benzoyl-2,4,6-trimethylbenzoyl)(phenyl)phosphinate (CAS 1539267-56-5); α,α',α''-1,2,3-propanetriyltris[ω-[[phenyl(1,4,6-trimethylbenzoyl)phosphinyl]oxy]-poly(oxy-1,2-ethanediyl) (CAS 1834525-17-5); and mixtures thereof. Still more preferably the acyl phosphine oxide compounds are selected from the group consisting of 2,4,6-trimethylbenzoyl-ethoxylphenylphosphine oxide (CAS 84434-11-7); phenylbis(2,4,6-trimethylbenzoyl)phosphine oxide (CAS 162881-26-7); and mixtures thereof.

Preferably, the alpha-amino-ketone compounds are selected from the group consisting of 2-(dimethylamino)-1-(4-morpholinophenyl)-2-benzyl-1-butanone (CAS 119313-12-1, sold for example by IGM Resins under the name Omnirad 248); 2-(4-methylbenzyl)-2-(dimethylamino)-1-(4-morpholinophenyl)-1-butanone (CAS 119344-86-4, sold for example by IGM Resins under the name Omnirad 379); 2-methyl-1-(4-methylsulfanylphenyl)-2-morpholin-4-ylpropan-1-one (CAS 71868-10-5, sold for example by IGM Resins under the name Omnirad 4817); 1-(9,9-dibutyl-9H-fluoren-2-yl)-2-methyl-2-(4-morpholinyl)-1-propanone (CAS 2020359-04-8, sold for example by Rahn under the name GENOCURE* FMP); α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (CAS 886463-10-1, sold for example by IGM Resins under the name Omnipol 910); and mixtures thereof. More preferably, the alpha-amino-ketone compounds are selected from the group consisting of 2-methyl-1-(4-methylsulfanylphenyl)-2-morpholin-4-ylpropan-1-one (CAS 71868-10-5); 1-(9,9-dibutyl-9H-fluoren-2-yl)-2-methyl-2-(4-morpholinyl)-1-propanone (CAS 2020359-04-8); α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (CAS 886463-10-1); and mixtures thereof. Still more preferably, the alpha-amino-ketone compounds are selected from the group consisting of 2-methyl-1-(4-methylsulfanylphenyl)-2-morpholin-4-ylpropan-1-one (CAS 71868-10-5); 1-(9,9-dibutyl-9H-fluoren-2-yl)-2-methyl-2-(4-morpholinyl)-1-propanone (CAS 2020359-04-8); and α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-

1-piperazinyl]-1-oxopropoxy]-poly(oxy-1,2-ethanediyl) (CAS 886463-10-1); and mixtures thereof.

Preferably, the benzophenone compounds are selected from the group consisting of [1,1'-biphenyl]-4-ylphenyl-methanone (CAS 2128-93-0, sold for example by IGM Resins under the name Omnirad 4PBZ); 4-(4-methylphenylthio) benzophenone (CAS 83846-85-9, sold for example by Lambson under the name SpeedCure BMS); 4,4'-bis (diethylamino)benzophenone (CAS 90-93-7 sold for example by Lambson under the name SpeedCure EMK); 1-[4-(4-benzoylphenylsulfanyl)phenyl]-2-methyl-2-[(4-methylphenyl)sulfonyl]propan-1-one (CAS 272460-97-6, sold for example by IGM Resins under the name ESACURE 1001M); and mixtures thereof. More preferably, the benzophenone compounds are selected from the group consisting of [1,1'-biphenyl]-4-ylphenylmethanone (CAS 2128-93-0); 4-(4-methylphenylthio)benzophenone (CAS 83846-85-9); 4,4'-bis(diethylamino)benzophenone (CAS 90-93-7); 1-[4-(4-benzoylphenylsulfanyl)phenyl]-2-methyl-2-[(4-methylphenyl)sulfonyl]propan-1-one (CAS 272460-97-6); and mixtures thereof. Still more preferably, the benzophenone compounds are selected from the group consisting of 4,4'-bis(diethylamino)benzophenone (CAS 90-93-7); and 1-[4-(4-benzoylphenylsulfanyl)phenyl]-2-methyl-2-[(4-methylphenyl)sulfonyl]propan-1-one (CAS 272460-97-6); and mixtures thereof.

Preferably, the glyoxylate compounds are selected from the group consisting of 2-oxo-2-phenylacetic acid methyl ester (CAS 15206-55-0, sold for example by IGM Resins under the name Omnirad MBF); 2-[2-oxo-2-phenyl-acetoxy-ethoxy]ethyl 2-oxo-2-phenylacetate (CAS 211510-16-6, sold for example by IGM Resins under the name Omnirad 754); α-(1-oxo-2-phenylacetyl)-ω-[(1-oxo-2-phenylacetyl)oxy]-poly(oxy-1,4-butanediyl) (CAS 1313205-82-1, sold for example by IGM Resins under the name Omnipol 2712); and mixtures thereof. More preferably the glyoxylate compounds are selected from the group consisting of 2-2-oxo-2-phenylacetic acid methyl ester (CAS 15206-55-0); 2-[2-oxo-2-phenyl-acetoxy-ethoxy]ethyl 2-oxo-2-phenylacetate (CAS 211510-16-6); and mixtures thereof.

Preferably, the benzyl ketal compounds are 2,2-dimethoxy-1,2-diphenylethan-1-one (CAS 24650-42-8, sold for example by Rahn under the name Omnirad BDK).

Preferably, the oxime ester compounds are selected from the group consisting of 5-[[4-(1-methylethyl)phenyl]thio]-1H-indene-1,2(3H)-dione 2-(O-acetyloxime) (CAS 1546704-29-3, sold for example by IGM Resins under the name Omnirad 1312); 1-[4-(phenylthio)phenyl]-1,2-octanedione 2-(O-benzoyloxime) (CAS 253585-83-0, sold for example by BASF under the name IRGACURE® OXE01); 3-cyclopentyl-1-[4-(phenylthio)phenyl]-1,2-propanedione-2-(O-benzoyloxime) (CAS 1196481-09-0); 4-cyclopentyl-1-[4-(phenylthio)phenyl]-1,2-butanedione 2-(O-benzoyloxime) (CAS 1206525-75-8, sold for example by Lambson under the name SpeedCure 8001); 1-[9-ethyl-6-(1-methylbenzoyl)-9H-carbazol-3-yl]ethanone-1-(O-acetyloxime) (CAS 478556-66-0, sold for example by BASF under the name IRGACURE® OXE02); 3-cyclopentyl-1-[9-ethyl-6-(1-methylbenzoyl)-9H-carbazol-3-yl]-1-propanone-1-(O-acetyloxime) (CAS 1227375-90-7, sold for example by Lambson under the name SpeedCure 8002); 1,8-bis(O-acetyloxime)-1,8-bis[9-(1-ethylhexyl)-6-nitro-9H-carbazol-3-yl]-1,8-octanedione (CAS 1241377-23-0, sold for example by ADEKA under the name ADEKA NCI-831); and mixtures thereof. More preferably, the oxime ester compounds are selected from the group consisting of 1-[4-(phenylthio)phenyl]-1,2-octanedione 2-(O-benzoyloxime) (CAS 253585-83-0); 4-cyclopentyl-1-[4-(phenylthio)phenyl]-1,2-butanedione 2-(O-benzoyloxime) (CAS 1206525-75-8); 1-[9-ethyl-6-(1-methylbenzoyl)-9H-carbazol-3-yl] ethanone-1-(O-acetyloxime) (CAS 478556-66-0); 3-cyclopentyl-1-[9-ethyl-6-(1-methylbenzoyl)-9H-carbazol-3-yl]-1-propanone-1-(O-acetyloxime) (CAS 1227375-90-7); 1,8-bis(O-acetyloxime)-1,8-bis[9-(1-ethylhexyl)-6-nitro-9H-carbazol-3-yl]-1,8-octanedione (CAS 1241377-23-0); and mixtures thereof. Still more preferably, the oxime ester compounds are 4-cyclopentyl-1-[4-(phenylthio)phenyl]-1,2-butanedione 2-(O-benzoyloxime) (CAS 1206525-75-8).

Preferably, the titanocene compounds are bis(cyclopentadienyl)-bis[2,6-difluoro-3-(pyrrol-1-yl)-phenyl]titanium (CAS 125051-32-3, sold for example by IGM Resins under the name Omnirad 784).

Preferably, the thioxanthone compounds are being selected from the group consisting of 2-isopropyl-9H-thioxanthen-9-one (CAS 5495-84-1, sold for example Lambson under the name SpeedCure 2-ITX or by (IGM Resins under the name Omnirad ITX); 4-(1-methylethyl)-9H-thioxanthen-9-one (CAS 83846-86-0); 2,4-diethyl-9H-thioxanthen-9-one (CAS 82799-44-8, sold for example IGM Resins under the name Omnipol TX); 2-chloro-9H-thioxanthen-9-one (CAS 86-39-5 sold for example Lambson); 1-chloro-4-propoxy-9H-thioxanthen-9-one (CAS 142770-42-1, sold for example Lambson under the name SpeedCure CPTX); 1,3-di[[α-[1-chloro-9-oxo-9H-thioxanthen-4-yl)oxy]acetylpoly [oxy(1-methylethylene)]]oxy]-2,2-bis [[α-[1-cloro-9-oxo-9H-thioxanthen-4-yl)oxy]acetylpoly[oxy(1-methylethylene)]]oxymethylpropane (CAS 1003567-83-6, sold for example Lambson under the name SpeedCure 7010/710L); 2-[2-[1-[2-[[2-(9-oxothioxanthen-2-yl)oxyacetyl]amino]-3-[1-[2-(1-prop-2-enoyloxyethoxy)ethoxy] ethoxy]-2-[1-[2-(1-prop-2-enoyloxyethoxy)ethoxy] ethoxymethyl]propoxy]ethoxy]ethoxy]ethyl prop-2-enoate (CAS 1427388-03-1, sold for example IGM Resins under the name Omnipol 3 TX); α-[2-[(9-Oxo-9H-thioxanthenyl) oxy]acetyl]-ω-[[2-[(9-oxo-9H-thioxanthenyl) oxy]acetyl] oxy]-poly(oxy-1,4-butanediyl) (CAS 813452-37-8); 2-thioxanthonyloxyacetic acid (CAS 84434-05-9, sold for example Lambson under the name SpeedCure CMTX); α-[(9-oxo-9H-thioxanthen-4-yl)carbonyl]-ω-[[(9-oxo-9H-thioxanthen-4-yl)carbonyl]oxy]-poly(oxy-1,2-ethanediyl) (CAS 1258512-68-3, sold for example Lambson under the name SpeedCure 7008); and oligomeric and polymeric compounds thereof (CAS 515139-51-2, sold for example by Rahn under the name GENOPOL* TX-1 and CAS 2055335-46-9, sold for example by Rahn under the name GENOPOL® TX-2); and mixtures thereof. More preferably, the thioxanthone compounds are being selected from the group consisting of 2-isopropyl-9H-thioxanthen-9-one (CAS 5495-84-1); 4-(1-methylethyl)-9H-thioxanthen-9-one (CAS 83846-86-0); 2,4-diethyl-9H-thioxanthen-9-one (CAS 82799-44-8); 1-chloro-4-propoxy-9H-thioxanthen-9-one (CAS 142770-42-1); 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane (CAS 1003567-83-6); 2-[2-[1-[2-[[2-(9-oxothioxanthen-2-yl)oxyacetyl]amino]-3-[1-[2-(1-prop-2-enoyloxyethoxy) ethoxy]ethoxy]-2-[1-[2-(1-prop-2-enoyloxyethoxy)ethoxy] ethoxymethyl]propoxy]ethoxy]ethoxy]ethyl prop-2-enoate (CAS 1427388-03-1); α-[2-[(9-Oxo-9H-thioxanthenyl)oxy] acetyl]-ω-[[2-[(9-oxo-9H-thioxanthenyl)oxy]acetyl]oxy]-poly(oxy-1,4-butanediyl) (CAS 813452-37-8); oligomeric and polymeric compounds thereof (CAS 515139-51-2and 2055335-46-9); and mixtures thereof. Still more preferably, the thioxanthone compounds is 2-isopropyl-9H-thioxanthen-9-one (CAS 5495-84-1).

Preferably, the coumarin compounds are 3-(4-$C_{10}$-$C_{13}$-benzoyl)-5,7-dimethoxy-2H-1-benzopyran-2-one (CAS 2243703-91-3, sold for example by IGM Resins under the name ESACURE 3644).

Preferably, the camphorquinone compounds are 1,7,7-trimethylbicyclo[2.2.1]heptane-2,3-dione (CAS 10373-78-1, sold for example by Rahn under the name GENOCURE* CQ).

When present, the one or more amine compounds of the top curable coating composition of step b) are preferably selected from the group consisting of 2-[(1-hydroxyethyl)(methyl)amino]ethan-1-ol (CAS 105-59-9, sold for example by Rahn under the name GENOCURE* MDEA); 4-ethoxy-carbonyl-N,N-dimethylaniline (CAS 10287-53-3, sold for example by Rahn under the name GENOCURE* EPD); 3-methylbutyl 4-(dimethylamino)benzoate (CAS 21245-01-2, sold for example by IGM Resins under the name Omnirad IADB); 2-ethylhexyl 4-(dimethylamino)benzoate (CAS 21245-02-3, sold for example by IGM Resins under the name Omnirad DMB); or 2-dimethylaminoethyl benzoate (CAS 2208-05-1); 2-butoxyethyl 4-(dimethylamino)benzoate (CAS 67362-76-9, sold for example by Lambson under the name SpeedCure BEDB); 1,1'-[(methylimino)di-2,1-ethanediyl]bis[4-(dimethylamino)benzoate] (CAS 925246-00-0, sold for example by Lamberti under the name ESACURE A198); butoxy polypropylene glycol 4-dimethylaminobenzoate (CAS 223463-45-4, sold for example by Lambson under the name SpeedCure PDA); poly(ethylene glycol) bis(p-dimethylaminobenzoate) (CAS 71512-90-8, sold for example by IGM Resins under the name Omnipol ASA); polymer of 4-(dimethylamino)benzoate with oxirane and 2-methyl-oxirane (CAS 1003557-17-2); polymer of 4-(dimethylamino)benzoate with 2-ethyl-2-(hydroxymethyl)-1,3-propanediol and oxirane (CAS 2067275-86-7, sold for example by Rahn under the name GENOPOL* AB-2); tetra-ether (4:1) of α-hydro-ω-[[4-(dimethylamino)benzoyl]oxy]-poly[oxy(methyl-1,2-ethanediyl)] with 2,2-bis(hydroxymethyl)-1,3-propane (CAS 1003567-84-7); reaction products of N-methylbenzenamine with 1,1'-[2-ethyl-2-[[(1-oxo-2-propen-1-yl)oxy]methyl]-1,3-propanediyl]-2-propenoate ester (CAS 2407644-16-8, sold for example by IGM Resins under the name Omnipol 894); and mixtures thereof. When present, more preferably, the one or more amine compounds of the top curable coating composition of step b) are preferably selected from the group consisting of 2-[(1-hydroxyethyl)(methyl) amino] ethan-1-ol (CAS 105-59-9); 3-methylbutyl 4-(dimethylamino)benzoate (CAS 21245-01-2); 2-dimethylaminoethyl benzoate (CAS 2208-05-1); 2-butoxyethyl 4-(dimethylamino)benzoate (CAS 67362-76-9); 1,1'-[(methylimino)di-2,1-ethanediyl]bis [4-(dimethylamino)benzoate] (CAS 925246-00-0); butoxy polypropylene glycol 4-dimethylaminobenzoate (CAS 223463-45-4); poly(ethylene glycol) bis (p-dimethylaminobenzoate) (CAS 71512-90-8); polymers of 4-(dimethylamino)benzoate with oxirane and 2-methyl-oxirane (CAS 1003557-17-2); polymers of 4-(dimethylamino)benzoate with 2-ethyl-2-(hydroxymethyl)-1,3-propanediol and oxirane (CAS 2067275-86-7); tetra-ether (4:1) of α-hydro-ω-[[4-(dimethylamino)benzoyl]oxy]-poly[oxy (methyl-1,2-ethanediyl)] with 2,2-bis(hydroxymethyl)-1,3-propane (CAS 1003567-84-7); reaction products of N-methylbenzenamine with 1,1'-[2-ethyl-2-[[(1-oxo-2-propen-1-yl) oxy]methyl]-1,3-propanediyl]-2-propenoate ester (CAS 2407644-16-8); and mixtures thereof. Still more preferably, the one or more amine compounds of the top curable coating composition of step b) of said 1st embodiment is poly (ethylene glycol) bis(p-dimethylaminobenzoate) (CAS 71512-90-8).

Preferred examples of combinations of the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) of said 1st embodiment are the following ones:

alpha-hydroxyketones of the radically radiation curable coating composition of step a) being selected from the group consisting of 2-hydroxy-2-methylpropiophenone (CAS 7473-98-5); 2-hydroxy-4'-hydroxyethoxy-2-methylpropiophenone (CAS 106797-53-9); and mixtures thereof, and the one or more compounds of the top curable coating composition of step b) are being from the group consisting of i-1") acyl phosphine oxide compounds being selected from the group consisting of 2,4,6-trimethylbenzoyl-ethoxylphenylphosphine oxide (CAS 84434-11-7); phenylbis(2,4,6-trimethylbenzoyl)phosphine oxide (CAS 162881-26-7); and mixtures thereof, i-2") alpha-amino-ketone compounds being selected from the group consisting of 2-methyl-1-(4-methylsulfanylphenyl)-2-morpholin-4-ylpropan-1-one (CAS 71868-10-5); 1-(9,9-dibutyl-9H-fluoren-2-yl)-2-methyl-2-(4-morpholinyl)-1-propanone (CAS 2020359-04-8); and α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (CAS 886463-10-1); and mixtures thereof, i-3") benzophenone compounds being selected from the group consisting of 4,4'-bis(diethylamino)benzophenone (CAS 90-93-7); and 1-[4-(4-benzoylphenylsulfanyl) phenyl]-2-methyl-2-[(4-methylphenyl)sulfonyl] propan-1-one (CAS 272460-97-6); and mixtures thereof and the one or more amine compounds being poly (ethylene glycol) bis(p-dimethylaminobenzoate) (CAS 71512-90-8), i-4") glyoxylate compounds being selected from the group consisting of 2-2-oxo-2-phenylacetic acid methyl ester (CAS 15206-55-0); 2-[2-oxo-2-phenyl-acetoxy-ethoxy]ethyl 2-oxo-2-phenylacetate (CAS 211510-16-6); and mixtures thereof optionally with one or more amine compounds being poly(ethylene glycol) bis(p-dimethylaminobenzoate) (CAS 71512-90-8), i-5") benzyl ketal compounds being 2,2-dimethoxy-1,2-diphenylethan-1-one (CAS 24650-42-8), i-6") oxime ester compounds being 4-cyclopentyl-1-[4-(phenylthio)phenyl]-1,2-butanedione 2-(O-benzoyloxime) (CAS 1206525-75-8);

i-7") titanocene compounds being bis(cyclopentadienyl)-bis[2,6-difluoro-3-(pyrrol-1-yl)-phenyl]titanium (CAS 125051-32-3);

i-8") thioxanthone compounds being 2-isopropyl-9H-thioxanthen-9-one (CAS 5495-84-1); and the one or more amine compounds being poly (ethylene glycol) bis(p-dimethylaminobenzoate) (CAS 71512-90-8), i-9") coumarin compounds being 3-(4-$C_{10}$-$C_{13}$-benzoyl)-5,7-dimethoxy-2H-1-benzopyran-2-one (CAS 2243703-91-3); and one or more amine compounds being poly(ethylene glycol) bis(p-dimethylaminobenzoate) (CAS 71512-90-8), i-10") camphorquinone compounds being 1,7,7-trimethylbicyclo[2.2.1]heptane-2,3-dione (CAS 10373-78-1); and one or more amine compounds being poly(ethylene glycol) bis(p-dimethylaminobenzoate) (CAS 71512-90-8), and i-11") mixtures thereof.

According to a 2nd embodiment, the one or more photo-reactive compounds not absorbing in the range from about 375 nm to about 470 nm of the radically radiation curable coating composition of step a) are mixtures of one or more benzophenone compounds different from the benzophenone compounds of the top curable coating composition of step b) of said 1st embodiment and one or more amine compounds such as those described for the one or more amine compounds of the top curable coating composition of step b) of the 1st embodiment, wherein said benzophenone compounds are preferably selected from the group consisting diphenylmethanone (CAS 119-61-9, sold for example by IGM Resins under the name Omnirad BP); 2-methylbenzophenone (CAS 131-58-8); (4-methylphenyl)phenylmethanone (CAS 134-84-9, sold for example by IGM Resins under the name Omnirad 4MBZ); 2,4,6-trimethylbenzophenone (CAS 954-16-5); 4-hydroxybenzophenone laurate (CAS 142857-24-7, sold for example by IGM Resins under the name Omnirad 4HBL); α-(1-oxo-2-propenyl)-ω-(4-benzoylphenoxy)-poly (oxy-1,2-ethanediyl) (9CI) (CAS 478549-43-8, sold for example by BCH Brühl under the name LoMiCure 450); polymer with of 2-benzoylbenzoate with oxirane and 2-methyl-oxirane (CAS 1003557-16-1); 2-benzoylbenzoic acid methyl ester (CAS 606-28-0, sold for example by Rahn under the name GENOCURE* MBB); 2-ethylhexyl 2-([1, 1'-biphenyl]-4-ylcarbonyl)benzoate (CAS 75005-95-7, sold for example by IGM Resins under the name Omnirad 991); α-(1-benzoylbenzoyl)-ω-[(1-benzoylbenzoyl)oxy]-poly (oxy-1,2-ethanediyl) (CAS 1246194-73-9, sold for example by IGM Resins under the name Omnipol 2702); [α-[(4-benzoylphenoxy)acetyl]-ω-[[2-(4-benzoylphenoxy)acetyl] oxy]-poly(oxy-1,4-butanediyl) (CAS 515136-48-8, sold for example by IGM Resins under the name Omnipol BP); 1,3-di[[α-2-(phenylcarbonyl)benzoylpoly[oxy(1-methylethylene)]]oxy]-2,2-bis[[α-2-(phenylcarbonyl)benzoylpoly [oxy(1-methylethylene)]]oxymethyl]propane (CAS 1003567-82-5); polymeric benzophenone derivatives (such as e.g., sold for example by Rahn under the name GENOPOL* BP-2 with CAS 2055335-45-8 or sold by Allnex under the name EBECRYL® P39 or sold by Double Bond Chemical under the name PolyQ® 102); and mixtures thereof. More preferably, the benzophenone compounds of the radically radiation curable coating composition of step a) of the 2nd embodiment are selected from the group consisting diphenylmethanone (CAS 119-61-9); (4-methylphenyl) phenylmethanone (CAS 134-84-9); 2,4,6-trimethylbenzophenone (CAS 954-16-5); 2-benzoylbenzoic acid methyl ester (CAS 606-28-0); 2-ethylhexyl 2-([1,1'-biphenyl]-4-ylcarbonyl)benzoate (CAS 75005-95-7); α-(1-benzoylbenzoyl)-ω-[(1-benzoylbenzoyl)oxy]-poly(oxy-1,2-ethanediyl) (CAS 1246194-73-9); [α-[(4-benzoylphenoxy)acetyl]-ω-[[2-(4-benzoylphenoxy)acetyl]oxy]-poly(oxy-1,4-butanediyl) (CAS 515136-48-8); and polymeric benzophenone derivatives (such as e.g. CAS 2055335-45-8). Still more preferably, the benzophenone compounds of the radically radiation curable coating composition of step a) of the 2nd embodiment are selected from the group consisting of diphenylmethanone (CAS 119-61-9); 2,4,6-trimethylbenzophenone (CAS 954-16-5); (4-methylphenyl)phenylmethanone (CAS 134-84-9); 2-benzoylbenzoic acid methyl ester (CAS 606-28-0).

According to said 2nd embodiment, the one or more compounds absorbing in the range from about 375 nm to about 470 nm of the top curable coating composition of step b) are selected from the group consisting of acyl phosphine oxide compounds such as those described herein for the top curable coating composition of step b) of the 1st embodiment, alpha-amino-ketone compounds such as those described herein for the top curable coating composition of step b) of the 1st embodiment, benzophenone compounds such as those described herein for the top curable coating composition of step b) of the 1st embodiment, glyoxylate compounds such as those described herein for the top curable coating composition of step b) of the 1st embodiment (optionally with one or more amine compounds such as those described herein for the 1st embodiment), benzyl ketal compounds such as those described herein for the top curable coating composition of step b) of the 1st embodiment, oxime ester compounds, titanocene compounds such as those described herein for the top curable coating composition of step b) of the 1st embodiment, thioxanthone compounds such as those described herein for the top curable coating composition of step b) of the 1st embodiment, coumarin compounds such as those described herein for the top curable coating composition of step b) of the 1st embodiment, such as those described herein for the top curable coating composition of step b) of the 1st embodiment camphorquinone compounds such as those described herein for the top curable coating composition of step b) of the 1st embodiment; and mixtures thereof.

Preferred examples of combinations of the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) of said 2nd embodiment are the following ones:

the one or more benzophenone compounds of the radically radiation curable coating composition of step a) being selected from the group consisting of diphenylmethanone (CAS 119-61-9); 2,4,6-trimethylbenzophenone (CAS 954-16-5); (4-methylphenyl)phenylmethanone (CAS 134-84-9); 2-benzoylbenzoic acid methyl ester (CAS 606-28-0); the one or more amine compounds are selected from the group consisting of poly (ethylene glycol) bis(p-dimethylaminobenzoate) (CAS 71512-90-8); and the one or more compounds of the top curable coating composition of step b) are selected from the group consisting of ii-1") acyl phosphine oxide compounds being selected from the group consisting of 2,4,6-trimethylbenzoylethoxylphenylphosphine oxide (CAS 84434-11-7); phenylbis(2,4,6-trimethylbenzoyl)phosphine oxide (CAS 162881-26-7); ethyl(3-benzoyl-2,4,6-trimethylbenzoyl)(phenyl)phosphinate (CAS 1539267-56-5); and mixtures thereof, ii-2") alpha-amino-ketone compounds being selected from the group consisting of 1-(9,9-dibutyl-9H-fluoren-2-yl)-2-methyl-2-(4-morpholinyl)-1-propanone (CAS 2020359-04-8); and α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (CAS 886463-10-1); and mixtures thereof, ii-3") benzophenone compounds being different from the benzophenone compounds of the radically radiation curable coating composition of step a) and being selected from the group consisting of [1,1'-biphenyl]-4-ylphenylmethanone (CAS 2128-93-0); 4-(4-methylphenylthio)benzophenone (CAS 83846-85-9); 4,4'-bis(diethylamino)benzophenone (CAS 90-93-7); 1-[4-(4-benzoylphenylsulfanyl)phenyl]-2-methyl-2-[(4-methylphenyl)sulfonyl]propan-1-one (CAS 272460-97-6); and mixtures thereof, ii-4") glyoxylate compounds being 2-2-oxo-2-phenylacetic acid methyl ester (CAS 15206-55-0), ii-5") benzyl ketal compounds being 2,2-dimethoxy-1,2-diphenylethan-1-one (CAS 24650-42-8), ii-6") oxime ester compounds being 4-cyclopentyl-1-[4-(phenylthio)phenyl]-1,2-butanedione 2-(O-benzoyloxime) (CAS 1206525-75-8);

ii-7") titanocene compounds being bis(cyclopentadienyl)-bis[2,6-difluoro-3-(pyrrol-1-yl)-phenyl]titanium (CAS 125051-32-3), ii-8") thioxanthone compounds being 2-isopropyl-9H-thioxanthen-9-one (CAS 5495-84-1), ii-9") coumarin compounds being 3-(4-$C_{10}$-$C_{13}$-benzoyl)-5,7-dimethoxy-2H-1-benzopyran-2-one (CAS 2243703-91-3), ii-10") camphorquinone compounds being 1,7,7-trimethylbicyclo[2.2.1]heptane-2,3-dione (CAS 10373-78-1), and ii-11") mixtures thereof.

According to a 3$^{rd}$ embodiment, the one or more photo-reactive compounds not absorbing in the range from about 375 nm to about 470 nm of the radically radiation curable coating composition of step a) are benzyl ketal compounds different from the benzyl ketal compounds of the top curable coating composition of step b) of said 3$^{rd}$ embodiment, preferably said benzyl ketal compound are 2,2-diethoxyacetophenone (CAS 6175-45-7, sold for example by Rahn under the name GENOCURE* DEAP).

According to said 3rd embodiment, the one or more compounds absorbing in the range from about 375 nm to about 470 nm of the top curable coating composition of step b) are selected from the group consisting of acyl phosphine oxide compounds such as those described herein for the top curable coating composition of step b) of the 1$^{st}$ embodiment, alpha-amino-ketone compounds such as those described herein for the top curable coating composition of step b) of the 1$^{st}$ embodiment, mixtures of one or more benzophenone compounds such as those described herein for the top curable coating composition of step b) of the 1$^{st}$ embodiment) and one or more amine compounds such as those described herein for the top curable coating composition of step b) of the 1$^{st}$ embodiment, glyoxylate compounds such as those described herein for the top curable coating composition of step b) of the 1$^{st}$ embodiment (optionally with one or more amine compounds such as those described herein for the 1$^{st}$ embodiment), benzyl ketal compounds such as those described herein for the top curable coating composition of step b) of the 1$^{st}$ embodiment, oxime ester compounds such as those described herein for the top curable coating composition of step b) of the 1$^{st}$ embodiment, titanocene compounds such as those described herein for the top curable coating composition of step b) of the 1$^{st}$ embodiment, mixtures of one or more thioxanthone compounds such as those described herein for the top curable coating composition of step b) of the 1$^{st}$ embodiment and one or more amine compounds such as those described herein for the top curable coating composition of step b) of the 1$^{st}$ embodiment, mixtures of one or more coumarin compounds such as those described herein for the top curable coating composition of step b) of the 1$^{st}$ embodiment and one or more amine compounds such as those described herein for the top curable coating composition of step b) of the 1$^{st}$ embodiment, mixtures of one or more camphorquinone compounds such as those described herein for the top curable coating composition of step b) of the 1$^{st}$ embodiment and one or more amine compounds such as those described herein for the top curable coating composition of step b) of the 1$^{st}$ embodiment; and mixtures thereof.

Preferred examples of combinations of the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) of said 3$^{rd}$ embodiment are the following ones:

benzyl ketal compounds of the radically radiation curable coating composition of step a) being 2,2-diethoxyacetophenone (CAS 6175-45-7) and the one or more compounds of the top curable coating composition of step b) are selected from the group consisting of iii-6") oxime ester compounds being 4-cyclopentyl-1-[4-(phenylthio)phenyl]-1,2-butanedione 2-(O-benzoyloxime) (CAS 1206525-75-8), iii-7") titanocene compounds being bis(cyclopentadienyl)-bis[2,6-difluoro-3-(pyrrol-1-yl)-phenyl]titanium (CAS 125051-32-3), iii-8") thioxanthone compounds being 2-isopropyl-9H-thioxanthen-9-one (CAS 5495-84-1); and one or more amine compounds being poly(ethylene glycol) bis(p-dimethylaminobenzoate) (CAS 71512-90-8), and iii-11") mixtures thereof.

According to a 4$^{th}$ embodiment, the one or more photo-reactive compounds not absorbing in the range from about 375 nm to about 470 nm of the radically radiation curable coating composition of step a) benzoin ether compounds, preferably selected from the group consisting of 2-methoxy-1,2-diphenyl-ethanone (CAS 3524-62-7); 2-ethoxy-1,2-diphenyl-ethanone (CAS 574-09-4); 2-propoxy-1,2-diphenyl-ethanone (CAS 6652-27-3); 2-(1-methylethoxy)-1,2-diphenyl-ethanone (CAS 6652-28-4); 1,2-diphenyl-2-(1propen-1-yloxy)-ethanone (CAS 51891-92-0); 2-methoxy-1,2-diphenyl-1-propanone (CAS 26592-16-5); 2-ethoxy-1,2-diphenyl-1-propanone (CAS 27962-49-8); 2-(1-methylpropoxy)-1,2-diphenyl-1-propanone (CAS 27962-50-1); 2-(1-methylethoxy)-1,2-diphenyl-1-propanone (CAS 65177-73-3); 2-(ethenyloxy)-1,2-diphenyl-1-propanone (CAS 93831-39-1); 2-(allyloxy)-2-phenyl-propiophenone (CAS 27962-52-3); and mixtures thereof.

According to said 4$^{th}$ embodiment, the one or more compounds absorbing in the range from about 375 nm to about 470 nm of the top curable coating composition of step b) are the one or more compounds absorbing in the range from about 375 nm to about 470 nm of the top curable coating composition of step b) selected from the group consisting of acyl phosphine oxide compounds such as those described herein for the top curable coating composition of step b) of the 1$^{st}$ embodiment, alpha-amino-ketone compounds such as those described herein for the top curable coating composition of step b) of the 1$^{st}$ embodiment, mixtures of one or more benzophenone compounds such as those described herein for the top curable coating composition of step b) of the 1$^{st}$ embodiment and one or more amine compounds such as those described herein for the top curable coating composition of step b) of the 1$^{st}$ embodiment, glyoxylate compounds such as those described herein for the top curable coating composition of step b) of the $1^{st}$ embodiment, benzyl ketal compounds such as those described herein for the top curable coating composition of step b) of the $1^{st}$ embodiment, oxime ester compounds such as those described herein for the top curable coating composition of step b) of the $1^{st}$ embodiment, titanocene compounds such as those described herein for the top curable coating composition of step b) of the $1^{st}$ embodiment, mixtures of one or more thioxanthone compounds such as those described herein for the top curable coating composition of step b) of the $1^{st}$ embodiment and one or more amine compounds such as those described herein for the top curable coating composition of step b) of the $1^{st}$ embodiment, mixtures of one or more coumarin compounds such as those described herein for the top curable coating composition of step b) of the $1^{st}$ embodiment and one or more amine compounds such as those described herein for the top curable coating composition of step b) of the $1^{st}$ embodiment, mixtures of one or more camphorquinone compounds such as those described herein for the top curable coating composition of step b) of the $1^{st}$ embodiment and one or more amine compounds such as those described herein for the top curable coating composition of step b) of the $1^{st}$ embodiment; and mixtures thereof.

The method described herein comprises, partially simultaneously with or subsequently to the step b) described herein, a step c) of at least partially curing the one or more indicia (x30) and the one or more areas of the coating layer (x10) below said one or more indicia (x30) with a light-emitting-diode (LED) curing unit (x50). On the contrary to medium-pressure mercury lamps that have emission bands in the UV-A, UV-B and UV-C regions of the electromagnetic spectrum, UV-LED lamps emit radiation in the UV-A region and/or visible (Vis) region, e.g. in the range from about 375 nm to about 470 nm. Moreover, current UV-LED and Vis-LED lamps emit quasi monochromatic radiation, i.e. only emit at one wavelength, such as 385 nm, 395 nm, 405 nm or 450 nm. The step c) of at least partially curing the one or more indicia (x30) is carried out by exposure to UV light with the LED curing unit (x50), preferably by exposure to UV light at 385 nm and/or 395 nm and/or 405 nm and/or 450 nm, emitted from the LED curing unit (x50). By "partially simultaneously", it is meant that both steps are partly performed simultaneously, i.e. the times of performing each of the steps partially overlap. In the context described herein, when curing is performed partially simultaneously with the application step b), it must be understood that curing becomes effective after the formation of the one or more indicia (x30) before the complete or partial curing. Should the step c) being carried out subsequently to the step b) described herein, the time between said two steps is preferably less than 10 seconds and more preferably less than 5 seconds.

The method described herein comprises, subsequently to the step c) described herein, the step d) of exposing the coating layer (x10) to the magnetic field of the magnetic-field generating device described herein so as to orient at least a part of the non-spherical magnetic or magnetizable pigment particles. Said step d) of exposing the coating layer (x10) to a magnetic field of a magnetic-field generating device is preferably carried out to i) mono-axially orient the platelet-shaped magnetic or magnetizable pigment particles, ii) bi-axially orient the platelet-shaped magnetic or magnetizable pigment particles, iii) simultaneously or partially simultaneously mono-axially and bi-axially orient the platelet-shaped magnetic or magnetizable pigment particles, or iv) bi-axially and subsequently mono-axially orient the platelet-shaped magnetic or magnetizable pigment particles. According to one embodiment, the step d) is carried out so as to mono-axially orient at least a part of the magnetic or magnetizable pigment particles described herein. According to another embodiment, the step d) is carried out so as to bi-axially orient at least a part of the platelet-shaped magnetic or magnetizable pigment particles, preferably so as to bi-axially orient at least a part of the platelet-shaped magnetic or magnetizable pigment particles to have both their X-axes and Y-axes substantially parallel to the substrate surface. For embodiments wherein the method described herein comprises the step of exposing the coating layer (x10) to the magnetic field of the magnetic-field generating device described herein so as to bi-axially orient at least a part of the magnetic or magnetizable pigment particle, the coating layer (x10) may be subsequently exposed more than one time to said magnetic-field generating device. According to another embodiment, the step d) consists of simultaneously or partially simultaneously mono-axially and bi-axially orient the pigment particles. According to another embodiment, the step d) consists of two or more steps, wherein a first step is carried out so as to bi-axially orient at least a part of the platelet-shaped magnetic or magnetizable pigment particles and a second step is carried out so as to mono-axially orient at least a part of said particles.

Figure 2:
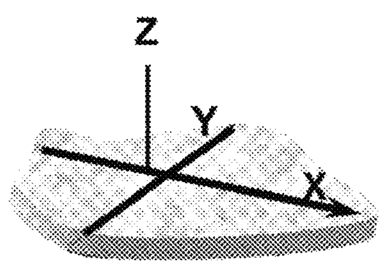
FIG. 2 schematically illustrates a non-spherical, in particular platelet-shaped, pigment particle.

For embodiments of the method described herein wherein the steps of exposing the coating layer (x10) to the magnetic field of the magnetic-field generating device described herein is carried out so as to bi-axially orient at least a part of the magnetic or magnetizable pigment particles, at least a part of the non-spherical magnetic or magnetizable pigment particles described herein is required to consist of platelet-shaped magnetic or magnetizable pigment particles having an X-axis and a Y-axis defining a plane of predominant extension of the particles. In contrast to needle-shaped pigment particles which can be considered as one-dimensional particles, platelet-shaped pigment particles have an X-axis and a Y-axis defining a plane of predominant extension of the particles. In other words, platelet-shaped pigment particles may be considered to be two-dimensional particles due to the large aspect ratio of their dimensions as can be seen in FIG. 2. As shown in FIG. 2, a platelet-shaped pigment particle can be considered as a two-dimensional structure wherein the dimensions X and Y are substantially larger than dimension Z. Platelet-shaped pigment particles are also referred in the art as oblate particles or flakes. Such pigment particles may be described with a main axis X corresponding to the longest dimension crossing the pigment particle and a second axis Y perpendicular to X which also lies within said pigment particles.

In contrast to a mono-axial orientation wherein magnetic or magnetizable pigment particles are orientated in such a way that only their main axis is constrained by the magnetic field, carrying out a bi-axial orientation means that the platelet-shaped magnetic or magnetizable pigment particles are made to orientate in such a way that their two main axes are constrained. That is, each platelet-shaped magnetic or magnetizable pigment particle can be considered to have a major axis in the plane of the pigment particle and an orthogonal minor axis in the plane of the pigment particle. The major and minor axes of the platelet-shaped magnetic or magnetizable pigment particles are each caused to orient according to the magnetic field. Effectively, this results in neighboring platelet-shaped magnetic pigment particles that are close to each other in space to be essentially parallel to each other. Put another way, bi-axial orientation aligns the planes of the platelet-shaped magnetic or magnetizable pigment particles so that the planes of said pigment particles are oriented to be essentially parallel relative to the planes of neighboring (in all directions) platelet-shaped magnetic or magnetizable pigment particles. The magnetic-field generating devices and the methods described herein allow to bi-axially orient the platelet-shaped magnetic or magnetizable pigment particles described herein such that the platelet-shaped magnetic or magnetizable pigment particles form a sheet-like structure with their X and Y axes preferably substantially parallel to the substrate (×20) surface and are planarized in said two dimensions.

Suitable magnetic-field generating devices for mono-axially orienting the magnetic or magnetizable pigment particles described herein are not limited and include for example dipole magnets, quadrupolar magnets and combinations thereof. The following devices are provided herein as illustrative examples.

Optical effects known as flip-flop effects (also referred in the art as switching effect) include a first printed portion and a second printed portion separated by a transition, wherein pigment particles are aligned parallel to a first plane in the first portion and pigment particles in the second portion are aligned parallel to a second plane. Methods and magnets for producing said effects are disclosed for example in in US 2005/0106367 and EP 1 819 525 B1.

Optical effects known as rolling-bar effects as disclosed in US 2005/0106367 may also be produced. A “rolling bar” effect is based on pigment particles orientation imitating a curved surface across the coating. The observer sees a specular reflection zone which moves away or towards the observer as the image is tilted. The pigment particles are aligned in a curving fashion, either following a convex curvature (also referred in the art as negative curved orientation) or a concave curvature (also referred in the art as positive curved orientation). Methods and magnets for producing said effects are disclosed for example in EP 2 263 806 A1, EP 1 674 282 B1, EP 2 263 807 A1, WO 2004/007095 A2, WO 2012/104098 A1, and WO 2014/198905 A2.

Optical effects known as Venetian-blind effects may also be produced. Venetian-blind effects include pigment particles being oriented such that, along a specific direction of observation, they give visibility to an underlying substrate surface, such that indicia or other features present on or in the substrate surface become apparent to the observer while they impede the visibility along another direction of observation Methods and magnets for producing said effects are disclosed for example in U.S. Pat. No. 8,025,952 and EP 1 819 525 B1.

Optical effects known as moving-ring effects may also be produced. Moving-ring effects consists of optically illusive images of objects such as funnels, cones, bowls, circles, ellipses, and hemispheres that appear to move in any x-y direction depending upon the angle of tilt of said optical effect layer. Methods and magnets for producing said effects are disclosed for example in EP 1 710 756 A1, U.S. Pat. No. 8,343,615, EP 2 306 222 A1, EP 2 325 677 A2, WO 2011/092502 A2, US 2013/0084411, WO 2014 108404 A2 and WO2014/108303 A1.

Optical effects providing an optical impression of a pattern of moving bright and dark areas upon tilting said effect may also be produced. Methods and magnets for producing said effects are disclosed for example in WO 2013/167425 A1.

Optical effects providing an optical impression of a loop-shaped body having a size that varies upon tilting said effect may also be produced. Methods and magnets for producing these optical effects are disclosed for example in WO 2017/064052 A1, WO 2017/080698 A1 and WO 2017/148789 A1.

Optical effects providing an optical impression of one or more loop-shaped bodies having a shape that varies upon tilting the optical effect layer may also be produced. Methods and magnets for producing said effects are disclosed for example in WO 2018/054819 A1.

Optical effects providing an optical impression of a moon crescent moving and rotating upon tilting may also be produced. Methods and magnets for producing said effects are disclosed for example in WO 2019/215148 A1.

Optical effects providing an optical impression of a loop-shaped body having a size and shape that varies upon tilting may be produced. Methods and magnets for producing said effects are disclosed for example in WO 2020/052862 A1.

Optical effects providing an optical impression of an ortho-parallactic effect, i.e. in the present case under the form of a bright reflective vertical bar moving in a longitudinal direction when the substrate is tilted about a horizontal/latitudinal axis or moving in a horizontal/latitudinal direction when the substrate is tilted about a longitudinal axis may be produced. Methods and magnets for producing said effects are disclosed for example in WO 2020/160993 A1.

Optical effects providing an optical impression of one loop-shaped body surrounded by one or more loop-shaped bodies, wherein said one or more one or more loop-shaped bodies have their shape and/or their brightness varying upon tilting may be produced. Methods and magnets for producing said effects are disclosed for example in WO 2020/193009 A1.

Optical effects providing an optical impression of a plurality of dark spots and a plurality of bright spots moving and/or appearing and/or disappearing not only in a diagonal direction when the substrate is tilted about a vertical/longitudinal axis but also moving and/or appearing and/or disappearing in a diagonal direction when the substrate is tilted may be produced. Methods and magnets for producing said effects are disclosed for example in WO 2021/083809 A1 and WO 2021/083808 A1.

The magnetic-field generating devices described herein may be at least partially embedded in a non-magnetic supporting matrix which is made of one or more non-magnetic materials.

The non-magnetic materials of the non-magnetic supporting plate (×40) described herein and the non-magnetic supporting matrix described herein are preferably independently selected from the group consisting of non-magnetic metals and engineering plastics and polymers. Non-magnetic metals include without limitation aluminum, aluminum alloys, brasses (alloys of copper and zinc), titanium, titanium alloys and austenitic steels (i.e. non-magnetic steels). Engineering plastics and polymers include without limitation polyaryletherketones (PAEK) and its derivatives polyetheretherketones (PEEK), polyetherketoneketones (PEKK), polyetheretherketoneketones (PEEKK) and polyetherketoneetherketoneketone (PEKEKK); polyacetals, polyamides, polyesters, polyethers, copolyetheresters, polyimides, polyetherimides, high-density polyethylene (HDPE), ultra-high molecular weight polyethylene (UHMWPE), polybutylene terephthalate (PBT), polypropylene, acrylonitrile butadiene styrene (ABS) copolymer, fluorinated and perfluorinated polyethylenes, polystyrenes, polycarbonates, polyphenylenesulfide (PPS) and liquid crystal polymers. Preferred materials are PEEK (polyetherketone), POM (polyoxymethylene), PTFE (polytetrafluoroethylene), Nylon® (polyamide) and PPS.

The magnetic-field generating devices described herein may comprise a magnetic plate carrying one or more reliefs, engravings or cut-outs. WO 2005/002866 A1 and WO 2008/046702 A1 are examples for such engraved magnetic plates.

The magnetic-field generating devices described herein may be a soft magnetic plate carrying one or more indicia in the form of indentations and/or protrusions or a soft magnetic plate comprising one or more voids having the shape of one or more indicia, wherein the orientation step is carried out by forming an assembly of the substrate (×20) carrying the coating layer (×10) above the soft magnetic plate and wherein said assembly is moved through an inhomogeneous magnetic field of a static magnetic-field-generating device (×40) so as to bi-axially orient at least a part of the platelet-shaped magnetic or magnetizable pigment particles as described in WO 2018/019594 A1 and WO 2018/033512 A1.

The magnetic-field generating devices described herein may be a magnetic assembly (×30) comprising a soft magnetic plate comprising one or more voids for receiving one or more dipole magnets and comprising one or more indentations and/or one or more protrusions forming one or more continuous loop-shaped indicia and/or one or more discontinuous loop-shaped indicia as described in WO 2020/025218 A1 or a magnetic assembly a soft magnetic comprising one or more voids and one or more dipole magnets being disposed within the one or more voids and/or are facing said one or more voids and/or one or more pairs of two dipole magnets being disposed below the soft magnetic plate and being spaced apart from the one or more voids as described in WO 2020/025482 A1.

Suitable magnetic-field generating devices for bi-axially orienting the platelet-shaped magnetic or magnetizable pigment particles described herein are not limited.

Particularly preferred devices for bi-axially orienting the pigment particles are disclosed in EP 2 157 141 A1. Upon motion of a substrate carrying a coating layer comprising pigment particles, the device disclosed in EP 2 157 141 A1 provides a dynamic magnetic field that changes its direction forcing the pigment particles to rapidly oscillate until both main axes, X-axis and Y-axis, become substantially parallel to the substrate surface, i.e. the pigment particles rotate until they come to the stable sheet-like formation with their X and Y axes substantially parallel to the substrate surface and are planarized in said two dimensions.

Other particularly preferred devices for bi-axially orienting the pigment particles comprise linear permanent magnet Halbach arrays, i.e. devices comprising a plurality of magnets with different magnetization directions and cylinder devices. Detailed description of Halbach permanent magnets was given by Z. Q. Zhu and D. Howe (Halbach permanent magnet machines and applications: a review, IEE. Proc. Electric Power Appl., 2001, 148, p. 299-308). The magnetic field produced by such a Halbach array has the properties that it is concentrated on one side while being weakened almost to zero on the other side. Linear Halbach arrays are disclosed for example in WO 2015/086257 A1 and WO 2018/019594 A1 and Halbach cylinder devices are disclosed in EP 3 224 055 B1.

Other particularly preferred devices for bi-axially orienting the pigment particles are spinning magnets, said magnets comprising disc-shaped spinning magnets or magnetic-field generating devices that are essentially magnetized along their diameter. Suitable spinning magnets or magnetic-field generating devices are described in US 2007/0172261 A1, said spinning magnets or magnetic-field generating devices generate radially symmetrical time-variable magnetic fields, allowing the bi-orientation of magnetic or magnetizable pigment particles of a not yet cured coating composition. These magnets or magnetic-field generating devices are driven by a shaft (or spindle) connected to an external motor. CN 102529326 B discloses examples of devices comprising spinning magnets that might be suitable for bi-axially orienting magnetic or magnetizable pigment particles. In a preferred embodiment, suitable devices for bi-axially orienting magnetic or magnetizable pigment particles are shaft-free disc-shaped spinning magnets or magnetic-field generating devices constrained in a housing made of non-magnetic, preferably non-conducting, materials and are driven by one or more magnet-wire coils wound around the housing. Examples of such shaft-free disc-shaped spinning magnets or magnetic-field generating devices are disclosed in WO 2015/082344 A1, WO 2016/026896 A1 and WO 2018/141547 A1.

Other particularly preferred devices for bi-axially orienting the pigment particles comprise a) at least a first set (S1) and a second set (S2), each of the first and second sets (S1, S2) comprising one first bar dipole magnet having its magnetic axis oriented to be substantially parallel to the substrate during the magnetic orientation and two second bar dipole magnets having their magnetic axes oriented to be substantially perpendicular to the substrate; and b) a pair (P1) of third bar dipole magnets having their magnetic axes oriented to be substantially parallel to the substrate such as those disclosed in WO 2021/239607 A1.

During the magnetic orientation steps described herein of the non-spherical magnetic or magnetizable pigment particles, the substrate (×20) carrying the coating layer (×10) may be disposed on a non-magnetic supporting plate (×40) which is made of one or more non-magnetic materials.

During the magnetic orientation steps described herein of the magnetic or magnetizable pigment particles, the position of the magnetic-field-generating devices is not limited and depends on the choice and the design of the magnetic orientation pattern to be produced. Depending on the choice and the design of the magnetic orientation pattern to be produced, the magnetic-field-generating devices may be placed below the substrate (×20) or on top of the coating layer (×10).

The method described herein comprises, partially simultaneously with or subsequently to the step d) described herein, a step e) of at least partially curing the coating layer (×10) with a curing unit (×60) at least emitting between 250 nm and 320 nm.

The method described herein comprises, partially simultaneously with or subsequently to the step d) described herein, a step e) of at least partially curing the coating layer (×10) with a curing unit (×60) at least emitting between 250 nm and 320 nm. By “partially simultaneously”, it is meant that both steps are partly performed simultaneously, i.e. the times of performing each of the steps partially overlap. In the context described herein, when curing is performed partially simultaneously with the application step c), it must be understood that curing becomes effective after the orientation of the non-spherical magnetic or magnetizable pigment particles in the coating layer (×10) before the complete or partial curing.

According to one embodiment and as shown for example in FIG. 1, the method described herein consists of the following steps:

the step a) of applying on the substrate (x20) surface the radically radiation curable coating composition comprising the non-spherical magnetic or magnetizable pigment particles described herein;

subsequently to step a), the step b) of applying the top coating composition in the form of one or more indicia (x30) on top of the coating layer (x10) described herein, partially simultaneously with or subsequently to step b), the step c) of at least partially curing the one or more indicia (x30) and the one or more areas of the coating layer (x10) below said one or more indicia (x30) with the LED curing unit (x50) described herein, subsequently to step c), the step d) of exposing the coating layer (x10) to the magnetic field of a magnetic-field generating device (B1) so as to orient at least a part of the magnetic or magnetizable pigment particles described herein in the areas of the coating layer (x10) not below said one or more indicia (x30), wherein said step d) may carried out so as to mono-axially orient (FIG. 1), bi-axially orient (not shown in FIG. 1), bi-axially then mono-axially orient (two steps, not shown in FIG. 1) or partially simultaneously or simultaneously bi-axially and mono-axially orient (one step, not shown in FIG. 1) at least a part of the magnetic or magnetizable pigment particles described herein; and partially simultaneously with or subsequently to step d), the step e) of at least partially curing the coating layer (x10) with the curing unit (x60) at least emitting between 250 nm and 320 nm described herein.

According to one embodiment, the method described herein may further comprise a step of exposing the coating layer (x10) to a magnetic field of a magnetic-field generating device so as to orient at least a part of the magnetic or magnetizable pigment particles, said step being carried out subsequently to or partially simultaneously with step b) and prior to step c), i.e. the method described herein may consists of the following steps:

the step a) of applying on the substrate (x20) surface the radically radiation curable coating composition comprising the non-spherical magnetic or magnetizable pigment particles described herein;

subsequently to step a), the step b) of applying the top coating composition in the form of one or more indicia (x30) on top of the coating layer (x10) described herein, subsequently to or partially simultaneously with step b), a step of exposing the coating layer (x10) to the magnetic field of a magnetic-field generating device so as to orient at least a part of the magnetic or magnetizable pigment particles described herein, wherein said step may be carried out so as to mono-axially orient (one step), bi-axially orient (one step), bi-axially then mono-axially orient (two steps) or partially simultaneously or simultaneously bi-axially and mono-axially orient (one step) at least a part of the magnetic or magnetizable pigment particles described herein, subsequently to step b) and the orientation step with the magnetic-field generating device described above, the step c) of at least partially curing the one or more indicia (x30) and the one or more areas of the coating layer (x10) below said one or more indicia (x30) with the LED curing unit (x50) described herein, subsequently to step c), the step d) of exposing the coating layer (x10) to the magnetic field of a second magnetic-field generating device so as to orient at least a part of the magnetic or magnetizable pigment particles described herein in the areas of the coating layer (x10) not below said one or more indicia (x30), wherein said step d) may carried out so as to mono-axially orient (one step), bi-axially orient (one step), bi-axially then mono-axially orient (two steps) or partially simultaneously or simultaneously bi-axially and mono-axially orient (one step) at least a part of the magnetic or magnetizable pigment particles described herein; and partially simultaneously with or subsequently to step d), the step e) of at least partially curing the coating layer (x10) with the curing unit (x60) at least emitting between 250 nm and 320 nm described herein.

According to another embodiment, the method described herein may further comprise a step of exposing the coating layer (x10) to a magnetic field of a magnetic-field generating device so as to orient at least a part of the magnetic or magnetizable pigment particles, said step being carried out subsequently to step a) and prior to step b).

According to one embodiment, the method described herein consists of the following steps:

the step a) of applying on the substrate (x20) surface the radically radiation curable coating composition comprising the non-spherical magnetic or magnetizable pigment particles described herein;

subsequently to step a), a step of exposing the coating layer (x10) to the magnetic field of a magnetic-field generating device so as to orient at least a part of the magnetic or magnetizable pigment particles described herein, wherein said step may carried out so as to mono-axially orient (one step), bi-axially orient (one step), bi-axially then mono-axially orient (two steps) or partially simultaneously or simultaneously bi-axially and mono-axially orient (one step) at least a part of the magnetic or magnetizable pigment particles described herein, partially simultaneously with or subsequently to the orientation step with the magnetic-field generating device described above, the step b) of applying the top coating composition in the form of one or more indicia (x30) on top of the coating layer (x10) described herein, partially simultaneously or subsequently to step b), the step c) of at least partially curing the one or more indicia (x30) and the one or more areas of the coating layer (x10) below said one or more indicia (x30) with the LED curing unit (x50) described herein, subsequently to step c), the step d) of exposing the coating layer (x10) to the magnetic field of a second magnetic-field generating device, of a third magnetic-field generating device or of a second and third magnetic-field generating devices so as to orient at least a part of the magnetic or magnetizable pigment particles described herein, wherein said step d) may carried out so as to mono-axially orient (one step), bi-axially orient (one step), bi-axially then mono-axially orient (two steps) or partially simultaneously or simultaneously bi-axially and mono-axially orient (one step) at least a part of the magnetic or magnetizable pigment particles described herein in the areas of the coating layer (x10) not below said one or more indicia (x30); and partially simultaneously with or subsequently to step d), the step e) of at least partially curing the coating layer (x10) with the curing unit (x60) at least emitting between 250 nm and 320 nm described herein.

According to another embodiment, the method described herein may consist of the following steps:

the step a) of applying on the substrate (x20) surface the radically radiation curable coating composition comprising the non-spherical magnetic or magnetizable pigment particles described herein;

subsequently to step a), a step of exposing the coating layer (×10) to the magnetic field of a magnetic-field generating device so as to orient at least a part of the magnetic or magnetizable pigment particles described herein, wherein said step may carried out so as to mono-axially orient (one step), bi-axially orient (one step), bi-axially then mono-axially orient (two steps) or partially simultaneously or simultaneously bi-axially and mono-axially orient (one step) at least a part of the magnetic or magnetizable pigment particles described herein, partially simultaneously with or subsequently to the orientation step with the magnetic-field generating device described above, the step b) of applying the top coating composition in the form of one or more indicia (×30) on top of the coating layer (×10) described herein, subsequently to step b), the step of exposing the coating layer (×10) to the magnetic field of a second magnetic-field generating device so as to orient at least a part of the magnetic or magnetizable pigment particles described herein, wherein said step may carried out so as to mono-axially orient (one step), bi-axially orient (one step), bi-axially then mono-axially orient (two steps) or partially simultaneously or simultaneously bi-axially and mono-axially orient (one step) at least a part of the magnetic or magnetizable pigment particles described herein;

partially simultaneously with or subsequently to the step of exposing the coating layer (×10) to the magnetic field of the second magnetic-field generating device, the step c) of at least partially curing the one or more indicia (×30) and the one or more areas of the coating layer (×10) below said one or more indicia (×30) with the LED curing unit (×50) described herein, subsequently to the step c), the step d) of exposing the coating layer (×10) to the magnetic field of a third magnetic-field generating device so as to orient at least a part of the magnetic or magnetizable pigment particles described herein in the areas of the coating layer (×10) not below said one or more indicia (×30), wherein said step d) may be carried out so as to mono-axially orient (one step), bi-axially orient (one step), bi-axially then mono-axially orient (two steps,) or partially simultaneously or simultaneously bi-axially and mono-axially orient (one step) at least a part of the magnetic or magnetizable pigment particles described herein; and partially simultaneously with or subsequently to step d), the step e) of at least partially curing the coating layer (×10) with the curing unit (×60) at least emitting between 250 nm and 320 nm described herein.

The three following steps: step a) of applying on the substrate (×20) surface the radically radiation curable coating composition comprising the non-spherical magnetic or magnetizable pigment particles described herein; subsequently to step a), the step b) of applying the top coating composition in the form of one or more indicia (×30) on top of the coating layer (×10) described herein, partially simultaneously with or subsequently to step b), the step c) of at least partially curing the one or more indicia (×30) and the one or more areas of the coating layer (×10) below said one or more indicia (×30) with the LED curing unit (×50) described herein may be carried out more than once, wherein said method with more than one steps a)-c) described herein further comprise, subsequently to the last step c), the step d) of exposing the coating layer (×10) to the magnetic field of a magnetic-field generating device so as to orient at least a part of the magnetic or magnetizable pigment particles described herein in the areas of the coating layer (×10) not below said one or more indicia (×30), wherein said step d) may carried out so as to mono-axially orient, bi-axially orient, bi-axially then mono-axially orient or partially simultaneously or simultaneously bi-axially and mono-axially orient at least a part of the magnetic or magnetizable pigment particles described herein; and partially simultaneously with or subsequently to step d), the step e) of at least partially curing the coating layer (×10) with the curing unit (×60) at least emitting between 250 nm and 320 nm described herein.

Alternatively, the steps a) and b) may be interchanged, i.e. the method the method described herein consists of the following steps:

the step of applying on the substrate surface the top coating composition in the form of the one or more indicia described herein, the step of applying the radically radiation curable coating composition comprising the non-spherical magnetic or magnetizable pigment particles described herein on top of the one or more indicia;

the step of exposing the coating layer to the magnetic field of a magnetic-field generating device so as to orient at least a part of the magnetic or magnetizable pigment particles described herein, wherein said step may carried out so as to mono-axially orient, bi-axially orient or bi-axially then mono-axially, or partially simultaneously or simultaneously bi-axially and mono-axially orient at least a part of the magnetic or magnetizable pigment particles described herein;

partially simultaneously with or subsequently to the orientation step, the step of at least partially curing the one or more indicia and the one or more areas of the coating layer (×10) on top of said one or more indicia (×30) with the LED curing unit (×50) described herein, subsequently the step of exposing the coating layer (×10) to the magnetic field of a magnetic-field generating device so as to orient at least a part of the magnetic or magnetizable pigment particles described herein in the areas of the coating layer (×10) not above said one or more indicia (×30), wherein said step may carried out so as to mono-axially orient, bi-axially orient or bi-axially then mono-axially or partially simultaneously or simultaneously bi-axially and mono-axially orient at least a part of the magnetic or magnetizable pigment particles described herein; and partially simultaneously with or subsequently to the orientation step, the step of at least partially curing the coating layer (×10) with the curing unit (×60) at least emitting between 250 nm and 320 nm described herein.

Alternatively, the step of at least partially curing the coating layer (×10) with the curing unit (×60) at least emitting between 250 nm and 320 nm described herein may be replaced by a step of at least partially curing the coating layer (×10) with the LED curing unit (×50) described herein provided that a second step of applying a top coating composition as described herein on the whole surface of the coating layer (×10) is carried out after the step of at least partially curing the one or more indicia (×30) and the one or more areas of the coating layer (×10) below said one or more indicia (×30) with the LED curing unit (×50). For example, the method described herein consists of the following steps:

the step of applying on the substrate surface the radically radiation curable coating composition comprising the non-spherical magnetic or magnetizable pigment particles described herein;

subsequently to said step, a step of exposing the coating layer (×10) to the magnetic field of a magnetic-field generating device so as to orient at least a part of the magnetic or magnetizable pigment particles described herein, wherein said step may carried out so as to mono-axially orient, bi-axially orient, bi-axially then mono-axially orient or partially simultaneously or simultaneously bi-axially and mono-axially orient, preferably so as to bi-axially orient, at least a part of the magnetic or magnetizable pigment particles described herein, partially simultaneously with or subsequently to the orientation step with the magnetic-field generating device described above, the step of applying a top coating composition as described herein in the form of one or more indicia (×30) on top of the coating layer (×10) described herein, subsequently to said step, the step of exposing the coating layer (×10) to the magnetic field of a second magnetic-field generating device so as to orient at least a part of the magnetic or magnetizable pigment particles described herein, wherein said step may carried out so as to mono-axially orient bi-axially then mono-axially orient or partially simultaneously or simultaneously bi-axially and mono-axially orient, preferably mono-axially orient, at least a part of the magnetic or magnetizable pigment particles described herein;

partially simultaneously with or subsequently to the step of exposing the coating layer (×10) to the magnetic field of the second magnetic-field generating device, a step of at least partially curing the top coating composition and the underlying coating layer (×10) with a LED curing unit (×50) described herein;

subsequently to said step, the step of applying a top coating composition as described herein on top of the whole surface of the coating layer (×10) described herein;

subsequently to said step, the step of exposing the coating layer (×10) to the magnetic field of a third magnetic-field generating device so as to orient at least a part of the magnetic or magnetizable pigment particles described herein, wherein said step may carried out so as to mono-axially orient bi-axially orient or partially simultaneously or simultaneously bi-axially and mono-axially orient, preferably mono-axially orient, at least a part of the magnetic or magnetizable pigment particles described herein; and partially simultaneously with or subsequently to said step, the step of at least partially curing the top coating composition and the coating layer (×10) with the LED curing unit (×50) described herein.

The present invention provides the methods described herein to produce optical effect layers (OELs) exhibiting one or more indicia (×30) on the substrates (×20) described herein and substrates (×20) comprising one or more optical effect layers (OELs) obtained thereof. The substrate (×20) described herein is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. According to another embodiment, the substrate (×20) described herein is based on plastics and polymers, metallized plastics or polymers, composite materials and mixtures or combinations of two or more thereof. Suitable examples of plastics and polymers include polyolefins such as polyethylene (PE) and polypropylene (PP) including biaxially oriented polypropylene (BOPP), polyamides, polyesters such as poly (ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc. When the OELs exhibiting one or more indicia (×30) produced according to the present invention are used for decorative or cosmetic purposes including for example fingernail lacquers, said OEL may be produced on other type of substrates including nails, artificial nails or other parts of an animal or human being.

Also described herein are methods of manufacturing a security document or a decorative element or object, comprising a) providing a security document or a decorative element or object, and b) providing the one or more optical effect layers described herein, in particular such as those obtained by the method described herein, so that it is comprised by the security document or decorative element or object.

Should the OEL produced according to the present invention be on a security document or article, and with the aim of further increasing the security level and the resistance against counterfeiting and illegal reproduction of said security document or article, the substrate may comprise printed, coated, or laser-marked or laser-perforated indicia, watermarks, security threads, fibers, planchettes, luminescent compounds, windows, foils, decals and combinations of two or more thereof. With the same aim of further increasing the security level and the resistance against counterfeiting and illegal reproduction of security documents and articles, the substrate may comprise one or more marker substances or taggants and/or machine readable substances (e.g. luminescent substances, UV/visible/IR absorbing substances, magnetic substances and combinations thereof).

If desired, a primer layer may be applied to the substrate prior to the step a). This may enhance the quality of the OEL described herein or promote adhesion. Examples of such primer layers may be found in WO 2010/058026 A2.

With the aim of increasing the durability through soiling or chemical resistance and cleanliness and thus the circulation lifetime of a security document, article or a decorative element or object comprising the OEL obtained by the method described herein, or with the aim of modifying their aesthetical appearance (e.g. optical gloss), one or more protective layers may be applied on top of the OEL. When present, the one or more protective layers are typically made of protective varnishes. Protective varnishes may be radiation curable compositions, thermal drying compositions or any combination thereof. Preferably, the one or more protective layers are radiation curable compositions, more preferable UV-Vis curable compositions. The protective layers are typically applied after the formation of the OEL.

The present invention further provides optical effect layers (OELs) exhibiting the one or more indicia (x30) described herein and produced by the methods described herein. The shape of the optical effect layers (OELs) described herein may be continuous or discontinuous. According to one embodiment, the shape of the coating layer (x10) represent one or more indicia, dots and/or lines, wherein said indicia may have the same shape as the one or more indicia (x30) made of the top coating composition described herein or may have a different shape.

The OEL exhibiting one or more indicia (x30) described herein may be provided directly on a substrate on which it shall remain permanently (such as for banknote applications). Alternatively, an optical effect layer may also be provided on a temporary substrate for production purposes, from which the OEL is subsequently removed. This may for example facilitate the production of the optical effect layer (OEL), particularly while the binder material is still in its fluid state. Thereafter, after curing of the coating composition for the production of the OEL, the temporary substrate may be removed from the OEL.

Alternatively, in another embodiment an adhesive layer may be present on the exhibiting one or more indicia (x30) or may be present on the substrate comprising the OEL, said adhesive layer being on the side of the substrate opposite to the side where the OEL is provided or on the same side as the OEL and on top of the OEL. Therefore, an adhesive layer may be applied to the OEL or to the substrate, said adhesive layer being applied after the curing step has been completed. Such an article may be attached to all kinds of documents or other articles or items without printing or other processes involving machinery and rather high effort. Alternatively, the substrate described herein comprising the OEL described herein may be in the form of a transfer foil, which can be applied to a document or to an article in a separate transfer step. For this purpose, the substrate is provided with a release coating, on which the OELs are produced as described herein. One or more adhesive layers may be applied over the so produced optical effect layer.

Also described herein are substrates comprising more than one, i.e. two, three, four, etc. optical effect layers (OELs) obtained by the method described herein.

Also described herein are articles, documents, in particular security documents, decorative elements and decorative objects comprising the optical effect layer (OEL) produced according to the present invention. The articles, in particular security documents, decorative elements or objects, may comprise more than one (for example two, three, etc.) OELs produced according to the present invention.

As mentioned hereabove, the OEL produced according to the present invention may be used for decorative purposes as well as for protecting and authenticating a security document.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Alternatively, the optical effect layer (OEL) described herein may be produced onto an auxiliary substrate such as for example a security thread, security stripe, a foil, a decal, a window or a label and consequently transferred to a security document in a separate step.

The skilled person can envisage several modifications to the specific embodiments described above without departing from the spirit of the present invention. Such modifications are encompassed by the present invention.

Further, all documents referred to throughout this specification are hereby incorporated by reference in their entirety as set forth in full herein.

EXAMPLES

The present invention is now described in more details with reference to non-limiting examples. The Examples below provide more details for the production of optical effects layers (OELs) exhibiting one or more indicia in the form of a rectangle. Screen printing compositions comprising magnetic pigment particles and top coating inkjet printing compositions have been prepared and are described in Tables 1A1-A3.

TABLE 1A-1

| | Screen printing composition SP | Inkjet top printing composition IJ | Viscosity (mPas at 25° C.) SP/IJ |
|---|---|---|---|
| E1 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 96% TPGDA, 4% Omnirad 380 | 487/14 |
| E2 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 2, 6% Omnirad 1173 | 96% TPGDA, 4% Omnirad 380 | 569/14 |
| E3 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 2959 | 92% TPGDA, 8% Omnirad TPO-L | 795/16 |
| E4 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% Omnipol 910 | 487/22 |
| E5 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% GENOCURE* FMP | 487/19 |
| E6 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% Omnirad 4817 | 487/17 |
| E7 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 95% TPGDA, 4% ESACURE 1001M, 1% Omnipol ASA | 487/17 |
| E8 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 90% TPGDA, 8% Omnirad EMK, 2% Omnipol ASA | 487/19 |
| E9 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% Omnirad MBF | 487/14 |
| E10 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% Omnirad 754 | 487/15 |
| E11 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 90% TPGDA, 8% Omnirad MBF, 2% Omnipol ASA | 487/13 |
| E12 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% Omnirad BDK | 487/17 |
| E13 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 92% TPGDA, 8% SpeedCure 8001 | 487/18 |
| E14 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 99% TPGDA, 1% Omnirad 784 | 487/14 |
| E15 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 96.2% TPGDA, 1.8% Omnirad ITX, 2% Omnipol ASA | 487/16 |

TABLE 1A-1-continued

| | Screen printing composition SP | Inkjet top printing composition IJ | Viscosity (mPas at 25° C.) SP/IJ |
|---|---|---|---|
| E16 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 90% TPGDA, 8% ESACURE 3644, 2% Omnipol ASA | 487/19 |
| E17 E17' | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 90% TPGDA, 8% GENOCURE* CQ, 2% Omnipol ASA | 487/13 |
| C1 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 98.2% TPGDA, 1.8% Omnirad ITX | 487/15 |
| C2 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 1173 | 95% HDDA, 4% SpeedCure EAQ, 1% Omnipol ASA | 487/7 |

% consist of the weight percentages being based on the total weight of the respective composition

TABLE 1A-2

| | Screen printing composition SP | Inkjet top printing composition IJ | Viscosity (mPas at 25° C.) SP/IJ |
|---|---|---|---|
| E18 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% Omnirad TPO-L | 568/16 |
| | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% GENOCURE* MBB, 2% Omnipol ASA | 92% TPGDA, 8% Omnirad TPO-L | 808/16 |
| E20 | 31% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 3% ESACURE TZT, 2% Omnipol ASA | 92% TPGDA, 8% Omnirad TPO-L | 761/16 |
| E21 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 96% TPGDA, 4% Omnirad 380 | 568/14 |
| E22 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 4% Omnirad TPO-L, 4% SpeedCure XKm | 568/16 |
| E23 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 90.8% TPGDA, 8% Omnirad TPO-L, 1.2% Omnirad ITX | 568/17 |
| E24 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% Omnipol 910 | 568/22 |
| E25 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% GENOCURE* FMP | 568/19 |
| E26 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 96% TPGDA, 4% ESACURE 1001M | 568/15 |

TABLE 1A-2-continued

| | Screen printing composition SP | Inkjet top printing composition IJ | Viscosity (mPas at 25° C.) SP/IJ |
|---|---|---|---|
| E27 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% Omnirad EMK | 568/19 |
| E28 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% SpeedCure BMS | 568/16 |
| E29 | 28% EBECRYL ® 2959, 20% TMPTA, 21.5% TPGDA, 1% GENORAD*16, 1% AEROSIL ® 200, 2% BYK, 2% TEGO ® Foamex N, 16.5% pigment 1, 6% Omnirad BP, 2% Omnipol ASA | 96% TPGDA, 4% Omnirad 4PBZ | 568/14 |
| E30 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% Omnirad MBF | 568/14 |
| E31 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% Omnirad BDK | 568/17 |
| E32 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% SpeedCure 8001 | 568/18 |
| E33 | 32% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 2% Omnirad BP, 2% Omnipol ASA | 99% TPGDA, 1% Omnirad 784 | 535/14 |
| E34 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 98.2% TPGDA, 1.8% Omnirad ITX | 568/15 |
| E35 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% ESACURE 3644 | 568/19 |
| E36 E36' | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% GENOCURE* CQ | 568/18 |
| C3 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 92% TPGDA, 8% Omnipol 2702 | 568/19 |
| C4 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad BP, 2% Omnipol ASA | 90% TPGDA, 8% Omnirad 991, 2% Omnipol ASA | 568/19 |
| C5 | 28% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% Omnirad 4MBZ, 2% Omnipol ASA | 96% HDDA, 4% SpeedCure EAQ | 647/8 |

% consist of the weight percentages being based on the total weight of the respective composition

TABLE 1A-3

| | Screen printing composition SP | Inkjet top printing composition IJ | Viscosity (mPas at 25° C.) SP/IJ |
|---|---|---|---|
| E37 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% GENOCURE* DEAP | 92% TPGDA, 8% SpeedCure 8001 | 514/18 |
| E38 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% GENOCURE* DEAP | 99% TPGDA, 1% Omnirad 784 | 514/14 |
| E39 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% GENOCURE* DEAP | 96.2% TPGDA, 1.8% Omnirad ITX, 2% Omnipol ASA | 514/16 |
| C6 | 30% EBECRYL ® 2959, 20% TMPTA, 21.5% TPGDA, 1% GENORAD*16, 1% AEROSIL ® 200, 2% BYK 371, 2% TEGO ® Foamex N, 16.5% pigment 1, 6% GENOCURE* DEAP | 98.2% TPGDA, 1.8% Omnirad ITX | 514/15 |

% consist of the weight percentages being based on the total weight of the respective composition wherein the following ingredients have been used:

EBECRYL® 2959: epoxy acrylate oligomer (Allnex) [CAS 106797-53-9]

TMPTA: trimethylol propane triacrylate (Allnex) [CAS 15625-89-5]

TPGDA: tripropylene glycol diacrylate (Allnex) [CAS 42978-66-5]

HDDA: 1,6-hexamethylene diacrylate (Allnex) [CAS 13048-33-4]

GENORAD*16: polymerization inhibitor (Rahn) [no CAS]

AEROSIL® 200: fumed silica (Evonik) [no CAS]

BYK 371: solution of an acrylfunctional polyester modified polydimethylsiloxane (BYK) [no CAS]

TEGO® Foamex N: (Evonik) [no CAS]

pigment 1: 7-layers green-to-blue platelet-shaped optically variable magnetic pigment particles having a flake shape of diameter $d_{50}$ about 10.7 μm and thickness about 1 μm (VIAVI Solutions, Santa Rosa, CA [no CAS]

pigment 2: 5-layer silver magnetic pigment particles having a flake shape of diameter $d_{50}$ about 19 μm and thickness about 1 μm (VIAVI Solutions, Santa Rosa, CA) [no CAS]

Omnirad 1173: 2-hydroxy-2-methylpropiophenone (IGM Resins) [CAS 7473-98-5]

Omnirad 2959: 2-hydroxy-4'-hydroxyethoxy-2-methylpropiophenone (IGM Resins) [CAS 106797-53-9]

Omnirad 380: phenylbis(2,4,6-trimethylbenzoyl)phosphine oxide (IGM Resins) [CAS 162881-26-7]

Omnirad TPO-L: 2,4,6-trimethylbenzoyl-ethoxylphenylphosphine oxide (IGM Resins) [CAS 84434-11-7]

Omnipol 910: α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (IGM Resins) [CAS 886463-10-1]

GENOCURE* FMP: 1-(9,9-dibutyl-9H-fluoren-2-yl)-2-methyl-2-(4-morpholinyl)-1-propanone (Rahn) [CAS 2020359-04-8]

Omnirad 4817: 2-methyl-1-(4-methylsulfanylphenyl)-2-morpholin-4-ylpropan-1-one (IGM Resins) [CAS 71868-10-5]

ESACURE 1001M: 1-[4-(4-benzoylphenylsulfanyl)phenyl]-2-methyl-2-[(4-methylphenyl)sulfonyl]propan-1-one (IGM Resins) [CAS 272460-97-6]

Omnipol ASA: poly(ethylene glycol) bis(p-dimethylaminobenzoate) (IGM Resins) [CAS 71512-90-8]

Omnirad EMK: 4,4'-bis(diethylamino)benzophenone (IGM Resins) [CAS 90-93-7]

Omnirad MBF: 2-oxo-2-phenylacetic acid methyl ester (IGM Resins) (CAS 15206-55-0);

Omnirad 754: 2-[2-oxo-2-phenyl-acetoxy-ethoxy]ethyl 2-oxo-2-phenylacetate (IGM Resins) [CAS 211510-16-6]

Omnirad BDK: 2,2-dimethoxy-1,2-diphenylethan-1-one (IGM Resins) [CAS 24650-42-8]

SpeedCure 8001: 4-cyclopentyl-1-[4-(phenylthio) phenyl]-1,2-butanedione 2-(O-benzoyloxime) (Lambson) [CAS 1206525-75-8]

Omnirad 784: bis(cyclopentadienyl)-bis[2,6-difluoro-3-(pyrrol-1-yl)-phenyl]titanium (IGM Resins) [CAS 125051-32-3]

Omnirad ITX: isopropyl-9H-thioxanthen-9-one (IGM Resins) [CAS 5495-84-1]

Omnirad BP: diphenylmethanone (IGM Resins) [CAS 119-61-9]

GENOCURE* MBB: 2-benzoylbenzoic acid methyl ester (Rahn) [CAS 606-28-0]

ESACURE 3644: 3-(4-$C_{10}$-$C_{13}$-benzoyl)-5,7-dimethoxy-2H-1-benzopyran-2-one (IGM Resins) [CAS 2243703-91-3]

GENOCURE* CQ: camphorquinone (Rahn) [CAS 10373-78-1]

SpeedCure EAQ: 2-ethyl-9,10-anthracenedione (Lambson) [CAS 84-51-5]

ESACURE TZT: blend (liquid eutectic) of 2,4,6-trimethylbenzophenone & (4-methylphenyl)phenylmethanone (IGM Resins) [CAS 954-16-5 & 134-84-9]

Omnirad 4MBZ: (4-methylphenyl)phenylmethanone (IGM) [CAS 134-84-9]

SpeedCure XKm: ethyl (3-benzoyl-2,4,6-trimethylbenzoyl)(phenyl)phosphinate (Lambson) [CAS 1539267-56-5]

SpeedCure BMS: 4-(4-methylphenylthio)benzophenone (Lambson) [CAS 83846-85-9]

Omnirad 4PBZ: 4-phenylbenzophenone (IGM Resins) [CAS 2128-93-0]

Omnipol 2702: α-(1-benzoylbenzoyl)-ω-[(1-benzoylbenzoyl)oxy]-poly(oxy-1,2-ethanediyl) (IGM Resins) [CAS 1246194-73-9]

Omnirad 991: 2-ethylhexyl 2-([1,1'-biphenyl]-4-ylcarbonyl)benzoate (IGM Resins) [CAS 75005-95-7]

SpeedCure EAQ: 2-ethyl-9,10-anthracenedione (Lambson) [CAS 84-51-5]

GENOCURE* DEAP: 2,2-diethoxyacetophenone (Rahn) [CAS 6175-45-7]

Preparation of the Compositions

The screen printing compositions were independently prepared by mixing the ingredients listed in Table 1A1-1A3 for 10 minutes at 2000 rpm using Dispermat CV-3.

The inkjet top printing compositions were independently prepared by mixing the ingredients listed in Tables 1A1-1A3 for 10 minutes at room temperature and at 1000 rpm using a Dispermat LC220-12.

The viscosities of the compositions were independently measured at 25° C. on a Brookfield viscometer (model "DV-I Prime", spindle S27 at 100 rpm for screen printing compositions and S00 at 50 rpm for top coating inkjet printing compositions) and are provided in Tables 1A1-1A3.

Methods of Preparation of the Optical Effect Layers (OELs)

Optical effect layers (OELs) have been prepared according to methods of the invention (E1-E39) and according to comparative methods (C1-C6).

As shown in FIG. 1, the method comprised the following steps:

- the step a) (not shown in the Fig.) of screen printing the screen printing composition on the substrate (120) so as to form the coating layer (110),
- subsequently to the step a), the step b) of inkjet printing the top coating inkjet printing composition so as to form the indicium (130),
- subsequently to step b), the step c) of at least partially curing the indicium (130) and the area of the coating layer (110) below said indicium (130) with the LED curing unit (150),
- subsequently to the step c), the step d) of exposing the coating layer (110) to the magnetic field of the magnetic-field generating device (B1) so as to mono-axially orient at least a part of the magnetic or magnetizable pigment particles in the not yet cured areas of the coating layer (110),
- partially simultaneously with the step d), the step e) of curing the coating layer (110) with the Hg curing unit (160) while maintaining the magnetic-field generating device (B1) in the vicinity of the coating layer (110), so as to form the optical effect layer.

Comparative examples C1-C6 have been made according to the following method:

- a step of screen printing the screen printing composition on the substrate so as to form the coating layer, subsequently, a step of inkjet printing the top coating inkjet printing composition so as to form the indicium,
- subsequently, a step of exposing the coating layer to the LED curing unit,
- subsequently, a step of exposing the coating layer to the magnetic field of a first magnetic-field generating device so as to mono-axially orient at least a part of the magnetic or magnetizable pigment particles in the not yet cured areas of the coating layer,
- partially simultaneously with the step of exposing the coating layer to the magnetic field of the first magnetic-field generating device, a step of exposing the coating layer to the Hg curing unit while maintaining the first magnetic-field generating device in the vicinity of the coating layer.

Screen Printing of the Screen Printing Compositions

The screen printing compositions described in Tables 1A1-A3 were independently applied by hand screen printing using a T90 screen on the substrate (Guardian™, substrate, thickness 75 micrometers, size: 70 mm×70 mm, from CCL Secure) (×20) so as to form a coating layer (×10) having the following dimensions: 25 mm×25 mm and a thickness of about 20 μm.

Inkjet Printing of the Top Coating Inkjet Printing Compositions

The top coating inkjet printing compositions described in Tables 1A1-A3 were independently applied at about 5 $g/m^2$ by DOD inkjet printing using a Konica Minolta KM1024i printhead (360 dpi) so as to form indicia having the shape of a rectangle having the following dimensions: 20 mm×12 mm.

Magnetic Orientation of the Screen Printing Compositions

The steps of exposing the coating layer (×10) to the magnetic field of the magnetic-field generating device described hereafter were independently carried out to mono-axially orient at least a part of the magnetic or magnetizable pigment particles comprised in the coating layer made of the screen printing compositions, wherein said magnetic-field generating device (B1) comprised a bar dipole magnet having a length of about 30 mm, a width of about 24 mm and a thickness of about 6 mm, wherein said bar dipole was embedded in a matrix made of POM and having the following dimensions: 40 mm×40 mm×15 mm. The North-South magnetic axis of the bar dipole magnet was parallel to the substrate (320) surface and parallel to the width. The bar dipole magnet was made of NdFeB N42.

During the magnetic orientation, the substrate (120) carrying the coating layer (110) was disposed on the non-magnetic supporting plate made of POM described hereabove with the coating layer (110) facing the environment so as to form an assembly. The assembly was placed in the vicinity and on top of the magnetic-field-generating device so that the substrate (120) was at a distance of about 6 mm from the top surface of the bar dipole magnet surface.

Curing Units

The following units were used for the preparation of the optical effect layers OELs:

- LED curing unit (150): UV-LED-lamp from OmniCure® (Type AC4 50×25 mm, 385 nm 8 $W/cm^2$) with an exposure time of for about 0.5 second for all examples except for E17' and E36', wherein a UV-LED-lamp (450 nm, 100 W) was used.
- Hg curing unit (160): two lamps: iron-doped mercury lamp 200 $W/cm^2$+mercury lamp 200 $W/cm^2$ from IST Metz GmbH; 2 passes 100 m/min).

After the curing steps, each sample was rubbed with a tissue to check the curing of both the coating layer (110) and indicium (130).

Figure 3A:
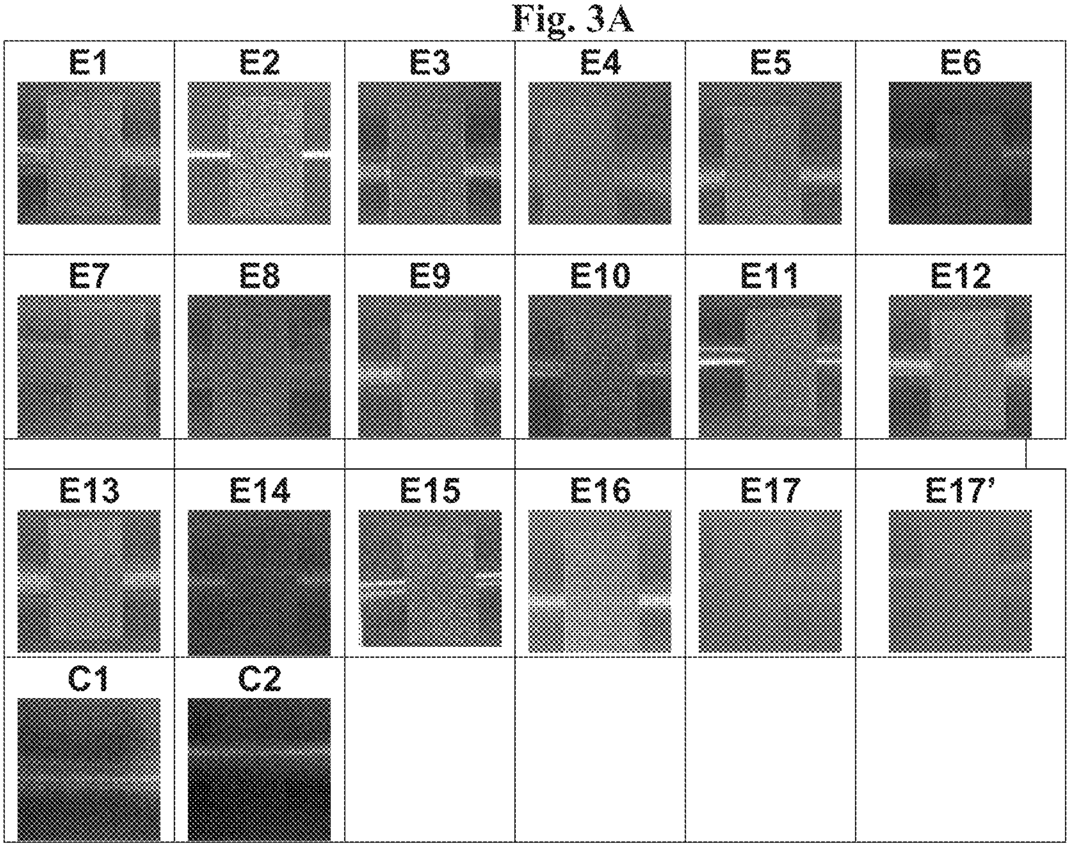
FIG. 3A-C show pictures of OELs prepared with the method according to the present invention (E1-E39) and prepared according to a comparative method (C1-C6).
Figure 3B:
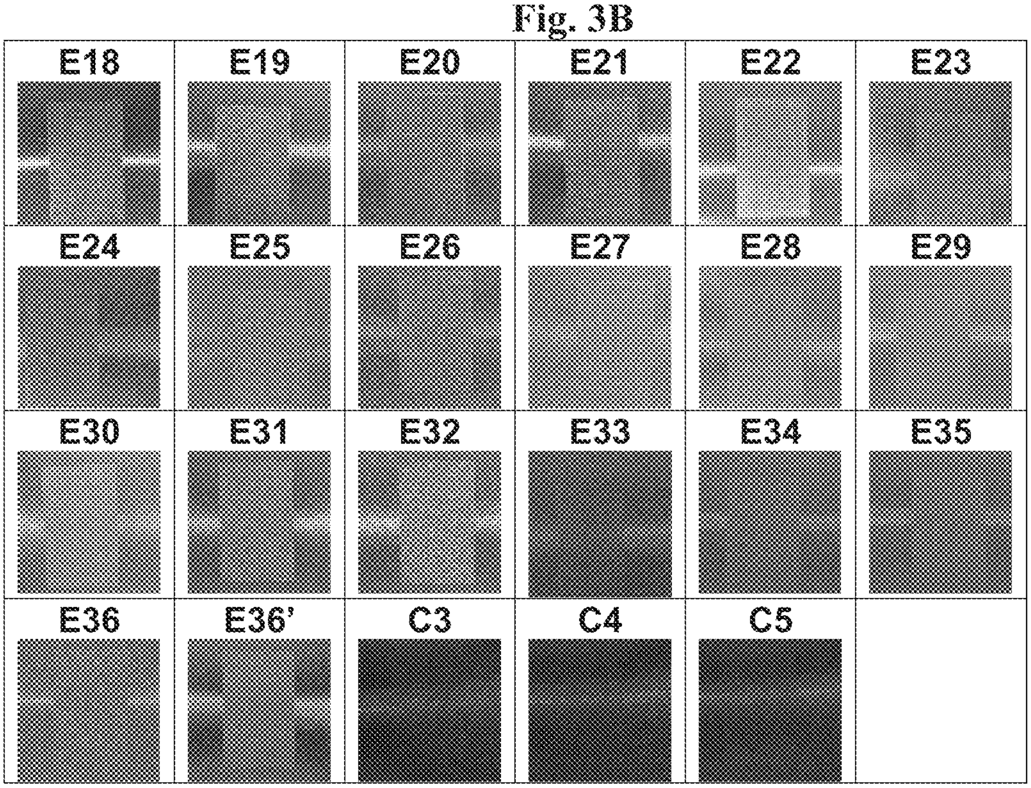
Figure 3C:
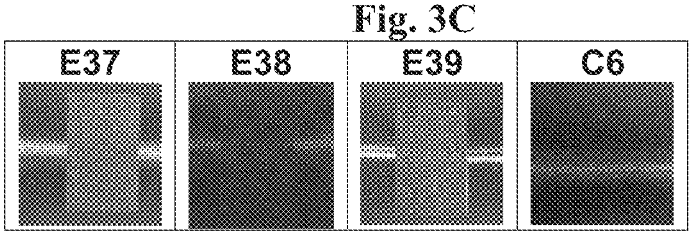

Pictures of Examples and Comparative Examples (FIG. 3A-C)

Pictures of the optical effect layers (OELs) produced as described hereabove are provided in FIG. 3A for the first embodiment described herein, 3B for the second embodiment described herein and 3C for the third embodiment described herein.

As shown by the pictures of in FIG. 3A (E1-E17), optical effect layers OELs exhibiting not only a dynamic movement of a rolling bar upon tilting the substrate due to the magnetic orientation of the particles with the magnetic-field generating device the particles, bright and highly reflective areas but also the indicium have been obtained by the claimed method using a) one or more alpha-hydroxy-ketone compounds, in particular one or more alpha-hydroxy-ketones selected from the group consisting of 2-hydroxy-2-methylpropiophenone (CAS 7473-98-5, Omnirad 1173) and 2-hydroxy-4'-hydroxyethoxy-2-methylpropiophenone (CAS 106797-53-9, Omnirad 2959) in the screen printing compositions and the following compounds in the inkjet top printing compositions:

b-i) one or more acyl phosphine oxide compounds, in particular one or more compounds selected from the group consisting of phenylbis(2,4,6-trimethylbenzoyl) phosphine oxide (CAS 162881-26-7, Omnirad 380) and 2,4,6-trimethylbenzoyl-ethoxylphenylphosphine oxide (CAS 84434-11-7, Omnirad TPO-L); or b-ii) one or more a-amino-ketone compounds, in particular one or more compounds selected from the group consisting of α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (CAS 886463-10-1, Omnipol 910); 1-(9,9-dibutyl-9H-fluoren-2-yl)-2-methyl-2-(4-morpholinyl)-1-propanone (CAS 2020359-04-8, GENOCURE* FMP) and 2-methyl-1-(4-methylsulfanylphenyl)-2-morpholin-4-ylpropan-1-one (CAS 71868-10-5, Omnirad 4817); or b-iii) one or more mixtures of one or more benzophenone compounds, in particular one or more compounds selected from the group consisting of 1-[4-(4-benzoylphenylsulfanyl)phenyl]-2-methyl-2-[(4-methylphenyl)sulfonyl]propan-1-one (CAS 272460-97-6, Esacure 1001M) and 4,4'-bis(diethylamino)benzophenone (CAS 90-93-7, Omnirad EMK) and one or more amine compounds, in particular poly(ethylene glycol) bis(p-dimethylaminobenzoate) (CAS 71512-90-8, Omnipol ASA); or b-iv) one or more glyoxylate compounds, in particular one or more compounds selected from the group consisting of 2-oxo-2-phenylacetic acid methyl ester (CAS 15206-55-0, Omnirad MBF) and 2-[2-oxo-2-phenylacetoxy-ethoxy]ethyl 2-oxo-2-phenylacetate (CAS 211510-16-6, Omnirad 754); or one or more mixtures of glyoxylate compounds, in particular 2-oxo-2-phenylacetic acid methyl ester (CAS 15206-55-0, Omnirad MBF) and one or more amine compounds, in particular poly(ethylene glycol) bis(p-dimethylaminobenzoate) (CAS 71512-90-8, Omnipol ASA); or b-v) one or more benzil diketal compounds, in particular 2,2-dimethoxy-1,2-diphenylethan-1-one (CAS 24650-42-8, Omnirad BDK); or b-vi) one or more oxime ester compounds, in particular 3-cyclopentyl-1-[4-(phenylthio) phenyl]-1,2-butanedione-2-(O-benzoyloxime) (CAS 1206525-75-8, SpeedCure 8001); or b-vii) one or more titanocene compounds, in particular bis(cyclopentadienyl)-bis[2,6-difluoro-3-(pyrrol-1-yl)-phenyl]titanium (CAS 125051-32-3, Omnirad 784); or b-viii) one or more mixtures of one or more thioxanthone compounds, in particular 2-isopropyl-9H-thioxanthen-9-one (CAS 5495-84-1, Omnirad ITX) and one or more amine compounds, in particular poly(ethylene glycol) bis(p-dimethylaminobenzoate) (CAS 71512-90-8, Omnipol ASA); or b-ix) one or more mixtures of one or more coumarin compounds, in particular 3-(4-$C_{10}$-$C_{13}$-benzoyl)-5,7-dimethoxy-2H-1-benzopyran-2-one (CAS 2243703-91-3, ESACURE 3644) and one or more amine compounds, in particular poly(ethylene glycol) bis(p-dimethylaminobenzoate) (CAS 71512-90-8, Omnipol ASA); or b-x) one or more mixtures of one or more camphorquinone compounds, in particular 1,7,7-trimethylbicyclo [2.2.1]heptane-2,3-dione (CAS 10373-78-1, GENOCURE* CQ) and on or more amine compounds, in particular and poly(ethylene glycol) bis(p-dimethylaminobenzoate) (CAS 71512-90-8, Omnipol ASA).

Contrary to the examples according to the present invention (E1-E17), comparative examples (C1-C2) made with same process than the claimed one except that the compounds in the screen printing composition and the compounds in the top coating inkjet printing composition did not consist of the first embodiments described herein, failed to exhibit the dynamic movement of a rolling bar upon tilting the substrate due to the magnetic orientation of the particles with the magnetic-field generating device, bright and highly reflective areas in combination with an indicium. Comparative examples C1-C2 exhibited a dynamic movement of a rolling bar upon tilting the substrate due to the magnetic orientation of the particles with the magnetic-field generating device but failed to show the indicium due to the absence of the specific one or more compounds absorbing in the range from about 375 nm to about 470 nm in the top curable coating composition.

As shown by the pictures of in FIG. 3B (E18-E36), optical effect layers OELs exhibiting not only a dynamic movement of a rolling bar upon tilting the substrate due to the magnetic orientation of the particles with the magnetic-field generating device the particles, bright and highly reflective areas but also the indicium have been obtained by the claimed method using a) one or more benzophenone compounds, in particular diphenylmethanone (CAS 119-61-9, Omnirad BP); 2-benzoylbenzoic acid methyl ester (CAS 606-28-0, GENOCURE* MBB); (4-methylphenyl) phenylmethanone (CAS 134-84-9 Omnirad MBZ) or a mixture of 2,4,6-trimethylbenzophenone and 4-methylbenzophenone (CAS 954-16-5 and CAS 134-84-9, ESACURE TZT), and one or more amine compounds, in particular poly(ethylene glycol) bis (p-dimethylaminobenzoate) (CAS 71512-90-8, Omnipol ASA), in the screen printing compositions and the following compounds in the inkjet top printing compositions:

b-i) one or more acyl phosphine oxide compounds, in particular one or more compounds selected from the group consisting of phenylbis(2,4,6-trimethylbenzoyl) phosphine oxide (CAS 162881-26-7, Omnirad 380) and 2,4,6-trimethylbenzoyl-ethoxylphenylphosphine oxide (CAS 84434-11-7, Omnirad TPO-L); or b-ii) one or more α-amino-ketone compounds, in particular one or more compounds selected from the group consisting of α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl) (CAS 886463-10-1 Omnipol 910) and 1-(9,9-dibutyl-9H-fluoren-2- yl)-2-methyl-2-(4-morpholinyl)-1-propanone (CAS 2020359-04-8, GENOCURE* FMP); or b-iii) one or more mixtures of one or more benzophenone compounds, in particular one or more compounds selected from the group consisting of 1-[4-(4-benzoylphenylsulfanyl)phenyl]-2-methyl-2-[(4-methylphenyl)sulfonyl]propan-1-one (CAS 272460-97-6, Esacure 1001M); 4,4'-bis(diethylamino)benzophenone (CAS 90-93-7, Omnirad EMK), 4-[(4-methylphenyl)thio]phenyl]phenyl-methanone (CAS 83846-85-9, SpeedCure BMS); and [1,1'-biphenyl]-4-ylphenyl-methanone (CAS 2128-93-0, Omnirad 4PBZ); or b-iv) one or more glyoxylate compounds, in particular 2-oxo-2-phenylacetic acid methyl ester (CAS 15206-55-0, Omnipol MBF); or b-v) one or more benzil diketal compounds, in particular 2,2-dimethoxy-1,2-diphenylethan-1-one (CAS 24650-42-8, Omnirad BDK); or b-vi) one or more oxime ester compounds, in particular 3-cyclopentyl-1-[4-(phenylthio)phenyl]-1,2-butanedione-2-(O-benzoyloxime) (CAS 1206525-75-8, SpeedCure 8001); or b-vii) one or more titanocene compounds, in particular bis(cyclopentadienyl)-bis[2,6-difluoro-3-(pyrrol-1-yl)-phenyl]titanium (CAS 125051-32-3, Omnirad 784); or b-viii) one or more mixtures of one or more thioxanthone compounds, in particular 2-isopropyl-9H-thioxanthen-9-one (CAS 5495-84-1, Omnirad ITX); or b-ix) one or more mixtures of one or more coumarin compounds, in particular 3-(4-$C_{10}$-$C_{13}$-benzoyl)-5,7-dimethoxy-2H-1-benzopyran-2-one (CAS 2243703-91-3, ESACURE 3644); or b-x) one or more mixtures of one or more camphorquinone compounds, in particular 1,7,7-trimethylbicyclo[2.2.1]heptane-2,3-dione (CAS 10373-78-1, GENOCURE* CQ).

Contrary to the examples according to the present invention (E19-E36), comparative examples (C3-C5) made with same process than the claimed one except that the compounds in the screen printing composition and the compounds in the top coating inkjet printing composition did not consist of the second embodiments described herein, failed to exhibit the dynamic movement of a rolling bar upon tilting the substrate due to the magnetic orientation of the particles with the magnetic-field generating device, bright and highly reflective areas in combination with an indicium. Comparative examples C3-C5 exhibited a dynamic movement of a rolling bar upon tilting the substrate due to the magnetic orientation of the particles with the magnetic-field generating device but failed to show the indicium due to the absence of the specific one or more compounds absorbing in the range from about 375 nm to about 470 nm in the top curable coating composition.

As shown by the pictures of in FIG. 3C (E37-E39), optical effect layers OELs exhibiting not only a dynamic movement of a rolling bar upon tilting the substrate due to the magnetic orientation of the particles with the magnetic-field generating device the particles, bright and highly reflective areas but also the indicium have been obtained by the claimed method using a) one or more benzil diketal compounds, in particular 2,2-diethoxy-1-phenyl-ethanone (CAS 6175-45-7 GENOCURE* DEAP) in the screen printing composition and the following compounds in the inkjet top printing compositions:

b-i) one or more oxime ester compounds, in particular 1,2-butanedione, 4-cyclopentyl-1-[4-(phenylthio)phenyl]-1,2-butanedione 2-(O-benzoyloxime) (CAS 1206525-75-8, SpeedCure 8001); or b-ii) one or more titanocene compounds (bis(cyclopentadienyl)-bis[2,6-difluoro-3-(pyrrol-1-yl)-phenyl]titanium (CAS 125051-32-3, Omnirad 784); or b-iii) one or more mixtures of one or more thioxanthone compounds, in particular 2-isopropyl-9H-thioxanthen-9-one (CAS 5495-84-1, Omnirad ITX) and one or more amine compounds, in particular poly(ethylene glycol) bis(p-dimethylaminobenzoate) (CAS 71512-90-8, Omnipol ASA).

Contrary to the examples according to the present invention (E37-E39), comparative example (C6) made with same process than the claimed one except that the compounds in the screen printing composition and the compounds in the top coating inkjet printing composition did not consist of the third embodiment described herein, failed to exhibit the dynamic movement of a rolling bar upon tilting the substrate due to the magnetic orientation of the particles with the magnetic-field generating device, bright and highly reflective areas in combination with an indicium. Comparative examples C6 exhibited a dynamic movement of a rolling bar upon tilting the substrate due to the magnetic orientation of the particles with the magnetic-field generating device but failed to show the indicium due to the absence of the specific one or more compounds absorbing in the range from about 375 nm to about 470 nm in the top curable coating composition.

The invention claimed is:

1. A method for producing an optical effect layer (OEL), said OEL comprising a motif made of at least two areas made of a single applied and cured layer comprising non-spherical magnetic or magnetizable pigment particles and exhibiting one or more indicia on a substrate, the method comprising the steps of:

a) applying on a substrate surface a radically radiation curable coating composition comprising the non-spherical magnetic or magnetizable pigment particles and one or more photo-reactive compounds not absorbing in a range from about 375 nm to about 470 nm, said radically radiation curable coating composition being in a first, liquid state so as to form a coating layer;

b) subsequently to step a), applying a top coating composition at least partially on top of the coating layer, wherein said top coating composition is applied in the form of one or more indicia and wherein said top coating composition is nonmagnetic and comprises one or more compounds absorbing in the range from about 375 nm to about 470 nm, and wherein the top coating composition and the coating layer are applied on each other in a wet-on-wet state, c) partially simultaneously with or subsequently to step b), at least partially curing the one or more indicia and the one or more areas of the coating layer below said one or more indicia with a LED curing unit emitting between 375 nm and 470 nm, thereby fixing an orientation of the non-spherical magnetic or magnetizable pigment particles in the one or more areas of the coating layer below said one or more indicia;

d) subsequently to step c), exposing the coating layer to a magnetic field of a magnetic-field generating device so as to orient at least a part of the non-spherical magnetic or magnetizable pigment particles; and e) partially simultaneously with or subsequently to step d), at least partially curing the coating layer with a curing unit at least emitting between 250 nm and 320 nm, wherein the radically radiation curable coating composition and the top coating composition are radically curable compositions, and wherein the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) are selected according to one of the following combinations:

i) the one or more photo-reactive compounds of the radically radiation curable coating composition of step a) are alpha-hydroxyketone compounds and the one or more compounds of the top curable coating composition of step b) are selected from the group consisting of acyl phosphine oxide compounds, alpha-amino-ketone compounds, mixtures of one or more benzophenone compounds and one or more amine compounds, glyoxylate compounds, benzyl ketal compounds, oxime ester compounds, titanocene compounds, mixtures of one or more thioxanthone compounds and one or more amine compounds, mixtures of one or more coumarin compounds and one or more amine compounds, mixtures of one or more camphorquinone compounds and one or more amine compounds; and mixtures thereof;

ii) the one or more photo-reactive compounds of the radically radiation curable coating composition of step a) are mixtures of one or more benzophenone compounds different from the benzophenone compounds of the top curable coating composition of step b) and one or more amine compounds and the one or more compounds of the top curable coating composition of step b) are selected from the group consisting of acyl phosphine oxide compounds, alpha-amino-ketone compounds, benzophenone compounds different from the benzophenone of the radically radiation curable coating composition of step a), glyoxylate compounds, benzyl ketal compounds, oxime ester compounds, titanocene compounds, thioxanthone compounds, coumarin compounds, camphorquinone compounds, and mixtures thereof, or iii) the one or more photo-reactive compounds of the radically radiation curable coating composition of step a) are benzyl ketal compounds different from the benzyl ketal compounds of the top curable coating composition of step b) and the one or more compounds of the top curable coating composition of step b) are selected from the group consisting of acyl phosphine oxide compounds, alpha-amino-ketone compounds, mixtures of one or more benzophenone compounds and one or more amine compounds, glyoxylate compounds, benzyl ketal compounds different from the benzyl ketal compounds of the top curable coating composition of step a), oxime ester compounds, titanocene compounds, mixtures of one or more thioxanthone compounds and one or more amine compounds, mixtures of one or more coumarin compounds and one or more amine compounds, mixtures of one or more camphorquinone compounds and one or more amine compounds, and mixtures thereof.

2. The method according to claim 1, wherein the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) are selected according to one of the following combinations:

i) the alpha-hydroxyketone compounds of the radically radiation curable coating composition of step a) being selected from the group consisting of 2-hydroxy-2-methylpropiophenone; 2-hydroxy-4'-hydroxyethoxy-2-methylpropiophenone; 2-hydroxy-1-[4-[4-(1-hydroxy-2-methylpropanoyl)phenoxy]phenyl]-2-methylpropan-1-one; (1-hydroxycyclohexyl)phenylmethanone; 2-hydroxy-1-[4-[4-(1-hydroxy-2-methylpropanoyl) phenoxy]phenyl]-2-methylpropan-1-one; 1-[2,3-dihydro-1-[4-(1-hydroxy-2-methyl-1-oxopropyl)phenyl]-1,3,3-trimethyl-1H-inden-5-yl]-2-hydroxy-2-methyl-1-propanone; ar-(1-hydroxy-2-methyl-1-oxopropyl) (1-methylethenyl)-benzene homopolymer; α-(1,1-dimethyl-2-oxo-2-phenylethyl)-ω-hydroxy-poly(oxy-1,2-ethanediyl) (9CI); polymeric alpha-hydroxy-ketone; and mixtures thereof, and the one or more compounds of the top curable coating composition of step b) are selected from the group consisting of i-1) acyl phosphine oxide compounds being selected from the group consisting of (1,4,6-trimethylbenzoyl)diphenylphosphine oxide; 2,4,6-trimethylbenzoyl-ethoxylphenylphosphine oxide; phenylbis(2,4,6-trimethylbenzoyl)phosphine oxide; bis(1,6-dimethoxybenzoyl)(1,4,4-trimethylpentyl) phosphine oxide; ethyl (3-benzoyl-2,4,6-trimethylbenzoyl)(phenyl)phosphinate; α,α',α"-1,2,3-propanetriyltris[ω-[[phenyl(1,4,6-trimethylbenzoyl)phosphinyl]oxy]-poly(oxy-1,2-ethanediyl); and mixtures thereof, i-2) alpha-amino-ketone compounds being selected from the group consisting of 2-(dimethylamino)-1-(4-morpholinophenyl)-2-benzyl-1-butanone; 2-(4-methylbenzyl)-2-(dimethylamino)-1-(4-morpholinophenyl)-1-butanone; 2-methyl-1-(4-methylsulfanylphenyl)-2-morpholin-4-ylpropan-1-one; 1-(9,9-dibutyl-9H-fluoren-2-yl)-2-methyl-2-(4-morpholinyl)-1-propanone; α-[3-[4-[4-[2-(dimethylamino)-2-(phenylmethyl)-1-oxobutyl] phenyl]-1-piperazinyl]-1-oxopropyl]-ω-[3-[4-[4-[2-(dimethylamino)-2-(phenylmethyl)-1-oxobutyl] phenyl]-1-piperazinyl]-1-oxopropoxy]-poly(oxy-1,2-ethanediyl); and mixtures thereof, i-3) benzophenone compounds being different from the benzophenone compounds of the radically radiation curable coating composition of step a) and being selected from the group consisting of [1,1'-biphenyl]-4-ylphenylmethanone; 4-(4-methylphenylthio) benzophenone; 4,4'-bis(diethylamino)benzophenone; 1-[4-(4-benzoylphenylsulfanyl)phenyl]-2-methyl-2-[(4-methylphenyl)sulfonyl]propan-1-one; and mixtures thereof and the one or more amine compounds being selected from the group consisting of 2-[(1-hydroxyethyl)(methyl)amino]ethan-1-ol; 4-ethoxycarbonyl-N,N-dimethylaniline; 3-methylbutyl 4-(dimethylamino) benzoate; 2-ethylhexyl 4-(dimethylamino)benzoate; 2-dimethylaminoethyl benzoate; 2-butoxyethyl 4-(dimethylamino)benzoate; 1,1'-[(methylimino)di-2,1-ethanediyl]bis[4-(dimethylamino)benzoate]; butoxy polypropylene glycol 4-dimethylaminobenzoate; poly(ethylene glycol) bis(p-dimethylaminobenzoate); polymers of 4-(dimethylamino)benzoate with oxirane and 2-methyl-oxirane; polymers of 4-(dimethylamino)benzoate with 2-ethyl-2-(hydroxymethyl)-1,3-propanediol and oxirane; tetra-ether (4:1) of α-hydro-ω-[[4-(dimethylamino)benzoyl]oxy]-poly[oxy(methyl-1,2-ethanediyl)] with 2,2-bis(hydroxymethyl)-1,3-propane; reaction products of N-methylbenzenamine with 1,1'-[2-ethyl-2-[[(1-oxo-2-propen-1-yl)oxy]methyl]-1,3-propanediyl]-2-propenoate ester; and mixtures thereof, i-4) glyoxylate compounds being selected from the group consisting of 2-oxo-2-phenylacetic acid methyl ester; 2-[2-oxo-2-phenyl-acetoxy-ethoxy] ethyl 2-oxo-2-phenylacetate; α-(1-oxo-2-phenylacetyl)-ω-[(1-oxo-2-phenylacetyl)oxy]-poly(oxy-1,4-butanediyl); and mixtures thereof, i-5) benzyl ketal compounds being 2,2-dimethoxy-1,2-diphenylethan-1-one, i-6) oxime ester compounds being selected from the group consisting of 5-[[4-(1-methylethyl)phenyl] thio]-1H-indene-1,2(3H)-dione 2-(O-acetyloxime); 1-[4-(phenylthio)phenyl]-1,2-octanedione 2-(O-benzoyloxime); 3-cyclopentyl-1-[4-(phenylthio)phenyl]-1,2-propanedione-2-(O-benzoyloxime); 4-cyclopentyl-1-[4-(phenylthio)phenyl]-1,2-butanedione 2-(O-benzoyloxime); 1-[9-ethyl-6-(1-methylbenzoyl)-9H-carbazol-3-yl]ethanone-1-(O-acetyloxime); 3-cyclopentyl-1-[9-ethyl-6-(1-methylbenzoyl)-9H-carbazol-3-yl]-1-propanone-1-(O-acetyloxime); 1,8-bis(O-acetyloxime)-1,8-bis[9-(1-ethylhexyl)-6-nitro-9H-carbazol-3-yl]-1,8-octanedione; and mixtures thereof, i-7) titanocene compounds being bis(cyclopentadienyl)-bis[2,6-difluoro-3-(pyrrol-1-yl)-phenyl]titanium, i-8) thioxanthone compounds being selected from the group consisting of 2-isopropyl-9H-thioxanthen-9-one; 4-(1-methylethyl)-9H-thioxanthen-9-one; 2,4-diethyl-9H-thioxanthen-9-one; 2-chloro-9H-thioxanthen-9-one; 1-chloro-4-propoxy-9H-thioxanthen-9-one; 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane; 2-[2-[1-[2-[[2-(9-oxothioxanthen-2-yl)oxyacetyl]amino]-3-[1-[2-(1-prop-2-enoyloxyethoxy)ethoxy]ethoxy]-2-[1-[2-(1-prop-2-enoyloxyethoxy)ethoxy]ethoxymethyl] propoxy]ethoxy]ethoxy]ethyl prop-2-enoate; α-[2-[(9-Oxo-9H-thioxanthenyl)oxy]acetyl]-ω-[[2-[(9-oxo-9H-thioxanthenyl)oxy]acetyl]oxy]-poly(oxy-1,4-butanediyl); 2-thioxanthonyloxyacetic acid; α-[(9-oxo-9H-thioxanthen-4-yl)carbonyl]-ω-[[(9-oxo-9H-thioxanthen-4-yl)carbonyl]oxy]-poly(oxy-1,2-ethanediyl); and oligomeric and polymeric compounds thereof, and mixtures thereof and the one or more amine compounds are those recited under i-3), i-9) coumarin compounds being 3-(4-$C_{10}$-$C_{13}$-benzoyl)-5,7-dimethoxy-2H-1-benzopyran-2-one and the one or more amine compounds being those recited under i-3), i-10) camphorquinone compounds being 1,7,7-trimethylbicyclo[2.2.1]heptane-2,3-dione and the one or more amine compounds are those recited under i-3), and mixtures thereof, and i-11) mixtures thereof;

ii) the benzophenone compounds of the radically radiation curable coating composition of step a) being selected from the group consisting of diphenylmethanone; 2-methylbenzophenone; (4-methylphenyl)phenylmethanone; 2,4,6-trimethylbenzophenone; 4-hydroxybenzophenone laurate; α-(1-oxo-2-propenyl)-ω-(4-benzoylphenoxy)-poly(oxy-1,2-ethanediyl) (9CI); polymer with of 2-benzoylbenzoate with oxirane and 2-methyl-oxirane; 2-benzoylbenzoic acid methyl ester; 2-ethylhexyl 2-([1,1'-biphenyl]-4-ylcarbonyl)benzoate; α-(1-benzoylbenzoyl)-ω-[(1-benzoylbenzoyl)oxy]-poly(oxy-1,2-ethanediyl)); [α-[(4-benzoylphenoxy) acetyl]-ω-[[2-(4-benzoylphenoxy)acetyl]oxy]-poly (oxy-1,4-butanediyl); 1,3-di[[α-2-(phenylcarbonyl) benzoylpoly[oxy(1-methylethylene)]]oxy]-2,2-bis[[α-2-(phenylcarbonyl)benzoylpoly[oxy(1-methylethylene)]]oxymethyl]propane; and polymeric benzophenone derivatives, the one or more amine compounds being selected from the group consisting of 2-[(1-hydroxyethyl)(methyl)amino]ethan-1-ol; 4-ethoxycarbonyl-N,N-dimethylaniline; 3-methylbutyl 4-(dimethylamino) benzoate; 2-ethylhexyl 4-(dimethylamino)benzoate; 2-dimethylaminoethyl benzoate; 2-butoxyethyl 4-(dimethylamino)benzoate; 1,1'-[(methylimino)di-2,1-ethanediyl]bis[4-(dimethylamino)benzoate]; butoxy polypropylene glycol 4-dimethylaminobenzoate; poly(ethylene glycol) bis(p-dimethylaminobenzoate); polymer of 4-(dimethylamino)benzoate with oxirane and 2-methyl-oxirane; polymer of 4-(dimethylamino)benzoate with 2-ethyl-2-(hydroxymethyl)-1,3-propanediol and oxirane; tetra-ether (4:1) of α-hydro-ω-[[4-(dimethylamino)benzoyl]oxy]-poly[oxy(methyl-1,2-ethanediyl)] with 2,2-bis(hydroxymethyl)-1,3-propane; reaction products of N-methylbenzenamine with 1,1'-[2-ethyl-2-[[(1-oxo-2-propen-1-yl)oxy]methyl]-1,3-propanediyl]-2-propenoate ester; and mixtures thereof, and the one or more compounds of the top curable coating composition of step b) are selected from the group consisting of ii-1) the acyl phosphine oxide compounds recited under i-1), ii-2) the alpha-amino-ketone compounds recited under i-2), ii-3) the benzophenone compounds recited under i-3), ii-4) the glyoxylate compounds recited under i-4), ii-5) the benzyl ketal compounds recited under i-5), ii-6) the oxime ester compounds recited under i-6), ii-7) the titanocene compounds recited under i-7), ii-8) the thioxanthone compounds recited under i-8), ii-9) the coumarin compounds recited under i-9), ii-10) the camphorquinone compounds recited under i-10), and ii-11) and mixtures thereof;

iii) the benzyl ketal compounds of the radically radiation curable coating composition of step a) being 2,2-diethoxyacetophenone and the one or more compounds of the top curable coating composition of step b) are selected from the group consisting of iii-1) the acyl phosphine oxide compounds recited under i-1), iii-2) the alpha-amino-ketone compounds recited under i-2), iii-3) the benzophenone compounds recited under i-3) and the one or more amine compounds being those recited under i-3), iii-4) the glyoxylate compounds recited under i-4)), iii-5) the benzyl ketal compounds recited under i-5), iii-6) the oxime ester compounds recited under i-6), iii-7) the titanocene compounds recited under i-7), iii-8) the thioxanthone compounds recited under i-8) and the one or more amine compounds being those recited under i-3), iii-9) the coumarin compounds recited under i-9) and the one or more amine compounds being those recited under i-3), iii-10) the camphorquinone compounds recited under i-10) and the one or more amine compounds being those recited under i-3), and iii-11) mixtures thereof.

3. The method according to claim 2, wherein the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) are selected according to one of the following combinations:

i') the alpha-hydroxyketones selected from the group consisting of 2-hydroxy-2-methylpropiophenone; 2-hydroxy-4'-hydroxyethoxy-2-methylpropiophenone; 2-hydroxy-1-[4-[4-(1-hydroxy-2-methylpropanoyl) phenoxy]phenyl]-2-methylpropan-1-one; (1-hydroxy-cyclohexyl)phenylmethanone; 2-hydroxy-1-[4-[4-(1-hydroxy-2-methylpropanoyl)phenoxy]phenyl]-2-methylpropan-1-one; 1-[2,3-dihydro-1-[4-(1-hydroxy-2-methyl-1-oxopropyl)phenyl]-1,3,3-trimethyl-1H-inden-5-yl]-2-hydroxy-2-methyl-1-propanone; ar-(1-hydroxy-2-methyl-1-oxopropyl) (1-methylethenyl)-benzene homopolymer; and mixtures thereof, and the one or more compounds of the top curable coating composition of step b) are selected from the group consisting of i-1') acyl phosphine oxide compounds selected from the group consisting of 2,4,6-trimethylbenzoyl-ethoxylphenylphosphine oxide; phenylbis(2,4,6-trimethylbenzoyl)phosphine oxide; bis(1,6-dimethoxybenzoyl)(1,4,4-trimethylpentyl)phosphine oxide; ethyl (3-benzoyl-2,4,6-trimethylbenzoyl) (phenyl)phosphinate; α,α',α"-1,2,3-propanetriyltris [ω-[[phenyl(1,4,6-trimethylbenzoyl)phosphinyl] oxy]-poly(oxy-1,2-ethanediyl); and mixtures thereof, i-2') alpha-amino-ketone compounds selected from the group consisting of 2-methyl-1-(4-methylsulfanylphenyl)-2-morpholin-4-ylpropan-1-one; 1-(9,9-dibutyl-9H-fluoren-2-yl)-2-methyl-2-(4-morpholinyl)-1-propanone; α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl); and mixtures thereof;

i-3') benzophenone compounds being different from the benzophenone compounds of the radically radiation curable coating composition of step a) and being selected from the group consisting of [1,1'-biphenyl]-4-ylphenylmethanone; 4-(4-methylphenylthio) benzophenone; 4,4'-bis(diethylamino)benzophenone; 1-[4-(4-benzoylphenylsulfanyl)phenyl]-2-methyl-2-[(4-methylphenyl)sulfonyl]propan-1-one; and mixtures thereof and the one or more amine compounds selected from the group consisting of 2-[(1-hydroxyethyl)(methyl)amino]ethan-1-ol; 3-methylbutyl 4-(dimethylamino) benzoate; 2-dimethylaminoethyl benzoate; 2-butoxyethyl 4-(dimethylamino)benzoate; 1,1'-[(methylimino)di-2,1-ethanediyl]bis[4-(dimethylamino)benzoate]; butoxy polypropylene glycol 4-dimethylaminobenzoate; poly(ethylene glycol) bis(p-dimethylaminobenzoate); polymers of 4-(dimethylamino)benzoate with oxirane and 2-methyl-oxirane; polymers of 4-(dimethylamino)benzoate with 2-ethyl-2-(hydroxymethyl)-1,3-propanediol and oxirane; tetra-ether (4:1) of α-hydro-ω-[[4-(dimethylamino)benzoyl]oxy]-poly[oxy(methyl-1,2-ethanediyl)] with 2,2-bis(hydroxymethyl)-1,3-propane; reaction products of N-methylbenzenamine with 1,1'-[2-ethyl-2-[[(1-oxo-2-propen-1-yl)oxy]methyl]-1,3-propanediyl]-2-propenoate ester, i-4') glyoxylate compounds selected from the group consisting of 2-oxo-2-phenylacetic acid methyl ester; 2-[2-oxo-2-phenyl-acetoxy-ethoxy]ethyl 2-oxo-2-phenylacetate; and mixtures thereof, i-5') benzyl ketal compounds being 2,2-dimethoxy-1,2-diphenylethan-1-one, i-6') oxime ester compounds selected from the group consisting of 1-[4-(phenylthio)phenyl]-1,2-octanedione 2-(O-benzoyloxime); 4-cyclopentyl-1-[4-(phenylthio)phenyl]-1,2-butanedione 2-(O-benzoyloxime); 1-[9-ethyl-6-(1-methylbenzoyl)-9H-carbazol-3-yl]ethanone-1-(O-acetyloxime); 3-cyclopentyl-1-[9-ethyl-6-(1-methylbenzoyl)-9H-carbazol-3-yl]-1-propanone-1-(O-acetyloxime); 1,8-bis(O-acetyloxime)-1,8-bis[9-(1-ethylhexyl)-6-nitro-9H-carbazol-3-yl]-1,8-octanedione; and mixtures thereof;

i-7') titanocene compounds being bis(cyclopentadienyl)-bis[2,6-difluoro-3-(pyrrol-1-yl)-phenyl]titanium;

i-8') thioxanthone compounds selected from the group consisting of 2-isopropyl-9H-thioxanthen-9-one; 4-(1-methylethyl)-9H-thioxanthen-9-one; 2,4-diethyl-9H-thioxanthen-9-one; 1-chloro-4-propoxy-9H-thioxanthen-9-one; 1,3-di[[α-[1-chloro-9-oxo-9H-thioxanthen-4-yl)oxy]acetylpoly[oxy(1-methylethylene)]]oxy]-2,2-bis[[α-[1-cloro-9-oxo-9H-thioxanthen-4-yl)oxy]acetylpoly[oxy(1-methylethylene)]]oxymethylpropane; 2-[2-[1-[2-[[2-(9-oxothioxanthen-2-yl)oxyacetyl]amino]-3-[1-[2-(1-prop-2-enoyloxyethoxy)ethoxy]ethoxy]-2-[1-[2-(1-prop-2-enoyloxyethoxy)ethoxy]ethoxymethyl] propoxy]ethoxy]ethoxy]ethyl prop-2-enoate; α-[2-[(9-Oxo-9H-thioxanthenyl)oxy]acetyl]-ω-[[2-[(9-oxo-9H-thioxanthenyl)oxy]acetyl]oxy]-poly(oxy-1,4-butanediyl); oligomeric and polymeric compounds thereof, and mixtures thereof, and the one or more amine compounds being those recited in i-3', i-9') coumarin compounds being 3-(4-$C_{10}$-$C_{13}$-benzoyl)-5,7-dimethoxy-2H-1-benzopyran-2-one and the one or more amine compounds being those recited in i-3', i-10') camphorquinone compounds being 1,7,7-trimethylbicyclo[2.2.1]heptane-2,3-dione and the one or more amine being those recited in i-3', and mixtures thereof, and i-11') mixtures thereof;

ii') the benzophenone compounds of the radically radiation curable coating composition of step a) being selected from the group consisting of diphenylmethanone; (4-methylphenyl)phenylmethanone; 2,4,6-trimethylbenzophenone; 2-benzoylbenzoic acid methyl ester; 2-ethylhexyl 2-([1,1'-biphenyl]-4-ylcarbonyl) benzoate; α-(1-benzoylbenzoyl)-ω-[(1-benzoylbenzoyl)oxy]-poly(oxy-1,2-ethanediyl); [α-[(4-benzoylphenoxy)acetyl]-ω-[[2-(4-benzoylphenoxy)acetyl]oxy]-poly(oxy-1,4-butanediyl); and polymeric benzophenone derivatives and the one or more amine compounds are selected from the group consisting of being those recited in i-3';

and the one or more compounds of the top curable coating composition of step b) are selected from the group consisting of ii-1') the acyl phosphine oxide compounds recited under i-1'), ii-2') the alpha-amino-ketone compounds recited under i-2'), ii-3') the benzophenone compounds recited under i-3'), ii-4') the glyoxylate compounds recited under i-4'), ii-5') the benzyl ketal compounds recited under i-5'), ii-6') the oxime ester compounds recited under i-6'), ii-7') the titanocene compounds recited under i-7'), ii-8') the thioxanthone compounds recited under i-8', ii-9') the coumarin compounds recited under i-9'), ii-10') the camphorquinone compounds recited under i-10'), and ii-11') mixtures thereof, iii') the benzyl ketal compounds of the radically radiation curable coating composition of step a) being 2,2-diethoxyacetophenone and the one or more compounds of the top curable coating composition of step b) are selected from the group consisting of iii-1') the acyl phosphine oxide compounds recited under i-1'), iii-2') the alpha-amino-ketone compounds recited under i-2'), iii-3') the benzophenone compounds recited under i-3') and the one or more amine compounds being those recited under i-3'), iii-4') the glyoxylate compounds recited under i-4'), iii-5') the benzyl ketal compounds recited under i-5'), iii-6') the oxime ester compounds recited under i-6'), iii-7') the titanocene compounds recited under i-7'), iii-8') the thioxanthone compounds recited under i-8') and the one or more amine compounds being those recited under i-3'), iii-9') the coumarin compounds recited under i-9') and the one or more amine compounds being those recited under i-3'), iii-10') the camphorquinone compounds recited under i-10') and the one or more amine compounds being those recited under i-3'), and iii-11') mixtures thereof.

4. The method according to claim 3, wherein the one or more photo-reactive compounds not absorbing in the range from about 375 nm to about 470 nm of the radically radiation curable coating composition of step a) and the one or more compounds absorbing in the range from about 375 nm to about 470 nm of the top curable coating composition of step b) are selected according to one of the following combinations:

i") the alpha-hydroxyketone compounds of the radically radiation curable coating composition of step a) being selected from the group consisting of 2-hydroxy-2-methylpropiophenone and 2-hydroxy-4'-hydroxyethoxy-2-methylpropiophenone; and mixtures thereof and the one or more compounds of the top curable coating composition of step b) are being from the group consisting of i-1") acyl phosphine oxide compounds being selected from the group consisting of 2,4,6-trimethylbenzoylethoxylphenylphosphine oxide; phenylbis(2,4,6-trimethylbenzoyl)phosphine oxide; and mixtures thereof, i-2") alpha-amino-ketone compounds being selected from the group consisting of 2-methyl-1-(4-methylsulfanylphenyl)-2-morpholin-4-ylpropan-1-one; 1-(9,9-dibutyl-9H-fluoren-2-yl)-2-methyl-2-(4-morpholinyl)-1-propanone; α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl); and mixtures thereof, i-3") benzophenone compounds being different from the benzophenone compounds of the radically radiation curable coating composition of step a) and being selected from the group consisting of 4,4'-bis(diethylamino)benzophenone; and 1-[4-(4-benzoylphenylsulfanyl)phenyl]-2-methyl-2-[(4-methylphenyl)sulfonyl]propan-1-one; and mixtures thereof and the one or more amine compounds being poly(ethylene glycol) bis(p-dimethylaminobenzoate), i-4") glyoxylate compounds being selected from the group consisting of 2-2-oxo-2-phenylacetic acid methyl ester; 2-[2-oxo-2-phenyl-acetoxy-ethoxy]ethyl 2-oxo-2-phenylacetate; and mixtures thereof, i-5") benzyl ketal compounds being 2,2-dimethoxy-1,2-diphenylethan-1-one, i-6") oxime ester being 4-cyclopentyl-1-[4-(phenylthio)phenyl]-1,2-butanedione 2-(O-benzoyloxime), i-7") titanocene compounds being bis(cyclopentadienyl)-bis[2,6-difluoro-3-(pyrrol-1-yl)-phenyl]titanium, i-8") thioxanthone compounds being 2-isopropyl-9H-thioxanthen-9-one; and the one or more amine compounds being poly(ethylene glycol) bis(p-dimethylaminobenzoate), i-9") coumarin compounds being 3-(4-$C_{10}$-$C_{13}$-benzoyl)-5,7-dimethoxy-2H-1-benzopyran-2-one the one or more amine compounds being poly(ethylene glycol) bis(p-dimethylaminobenzoate), i-10") camphorquinone compounds being 1,7,7-trimethylbicyclo[2.2.1]heptane-2,3-dione the one or more amine compounds being poly(ethylene glycol) bis(p-dimethylaminobenzoate), and i-11") mixtures thereof, ii") the benzophenone compounds of the radically radiation curable coating composition of step a) being selected from the group consisting of diphenylmethanone; 2,4,6-trimethylbenzophenone; (4-methylphenyl)phenylmethanone; 2-benzoylbenzoic acid methyl ester; the one or more amine compounds are selected from the group consisting of poly(ethylene glycol) bis(p-dimethylaminobenzoate) and the one or more compounds of the top curable coating composition of step b) are selected from the group consisting of ii-1") acyl phosphine oxide compounds being selected from the group consisting of 2,4,6-trimethylbenzoylethoxylphenylphosphine oxide; phenylbis(2,4,6-trimethylbenzoyl)phosphine oxide; ethyl (3-benzoyl-2,4,6-trimethylbenzoyl)(phenyl)phosphinate; and mixtures thereof, ii-2") alpha-amino-ketone compounds being selected from the group consisting of 1-(9,9-dibutyl-9H-fluoren-2-yl)-2-methyl-2-(4-morpholinyl)-1-propanone; and α-[3-[4-[4-[2-(dimethylamino)-2-(phenylmethyl)-1-oxobutyl]phenyl]-1-piperazinyl]-1-oxopropyl]-ω-[3-[4-[4-[2-(dimethylamino)-2-(phenylmethyl)-1-oxobutyl]phenyl]-1-piperazinyl]-1-oxopropoxy]-poly(oxy-1,2-ethanediyl); and mixtures thereof, ii-3") benzophenone compounds and being selected from the group consisting of [1,1'-biphenyl]-4-ylphenylmethanone; 4-(4-methylphenylthio)benzophenone;

4,4'-bis(diethylamino)benzophenone; 1-[4-(4-benzoylphenylsulfanyl)phenyl]-2-methyl-2-[(4-methylphenyl)sulfonyl]propan-1-one; and mixtures thereof, ii-4") glyoxylate compounds being 2-2-oxo-2-phenylacetic acid methyl ester, ii-5") benzyl ketal compounds being 2,2-dimethoxy-1,2-diphenylethan-1-one, ii-6") oxime ester compounds being 4-cyclopentyl-1-[4-(phenylthio)phenyl]-1,2-butanedione 2-(O-benzoyloxime), ii-7") the titanocene compounds being bis(cyclopentadienyl)-bis[2,6-difluoro-3-(pyrrol-1-yl)-phenyl]titanium, ii-8") thioxanthone compounds being 2-isopropyl-9H-thioxanthen-9-one; and the one or more amine compounds being poly(ethylene glycol) bis(p-dimethylaminobenzoate), ii-9") coumarin compounds being 3-(4-$C_{10}$-$C_{13}$-benzoyl)-5,7-dimethoxy-2H-1-benzopyran-2-one, ii-10") camphorquinone compounds being 1,7,7-trimethylbicyclo[2.2.1]heptane-2,3-dione, and ii-11") mixtures thereof;

iii") the benzyl ketal compounds of the radically radiation curable coating composition of step a) being 2,2-diethoxyacetophenone and the one or more compounds of the top curable coating composition of step b) are selected from the group consisting of iii-6") oxime ester compounds being 4-cyclopentyl-1-[4-(phenylthio)phenyl]-1,2-butanedione 2-(O-benzoyloxime), iii-7") titanocene compounds being bis(cyclopentadienyl)-bis[2,6-difluoro-3-(pyrrol-1-yl)-phenyl]titanium, iii-8") thioxanthone compounds being 2-isopropyl-9H-thioxanthen-9-one; and the one or more amine compounds being poly(ethylene glycol) bis(p-dimethylaminobenzoate), and iii-11") mixtures thereof.

5. The method according to claim 1, wherein the step d) of exposing the coating layer to a magnetic field of a magnetic-field generating device is carried out to i) mono-axially orient the pigment particles, ii) bi-axially orient the pigment particles, iii) simultaneously or partially simultaneously mono-axially and bi-axially orient the pigment particles, or iv) bi-axially and subsequently mono-axially orient the pigment particles.

6. The method according to claim 1, further comprising a step of exposing the coating layer to a magnetic field of a magnetic-field generating device so as to orient at least a part of the magnetic or magnetizable pigment particles, said step being carried out subsequently to or partially simultaneously with step b) and prior to with step c), said step being carried out to i) mono-axially orient the pigment particles, ii) bi-axially orient the pigment particles, iii) simultaneously or partially simultaneously mono-axially and bi-axially orient the pigment particles, or iv) bi-axially and subsequently mono-axially orient the pigment particles.

7. The method according to claim 1, further comprising a step of exposing the coating layer to a magnetic field of a magnetic-field generating device so as to orient at least a part of the magnetic or magnetizable pigment particles, said step being carried out subsequently to step a) and prior to or partially simultaneously step b), said step being carried out to i) mono-axially orient the pigment particles, ii) bi-axially orient the pigment particles, iii) simultaneously or partially simultaneously mono-axially and bi-axially orient the pigment particles, or iv) bi-axially and subsequently mono-axially orient the pigment particles.

8. The method according to claim 1, wherein the step a) of applying the radically radiation curable coating composition is carried out by a process selected from the group consisting of screen printing, rotogravure printing, pad printing and flexography printing.

9. The method according to claim 1, wherein the step b) of applying the top coating composition is carried out by a contactless fluid microdispensing technologies.

10. The method according to claim 1, wherein at least a part of the non-spherical magnetic or magnetizable particles is constituted by non-spherical optically variable magnetic or magnetizable pigment particles.

11. The method according to claim 10, wherein the non-spherical optically variable magnetic or magnetizable pigment particles are selected from the group consisting of magnetic thin-film interference pigment particles, magnetic cholesteric liquid crystal pigment particles and mixtures thereof.

12. The method according to claim 1, wherein the one or more indicia are selected from the group consisting of codes, symbols, alphanumeric symbols, motifs, geometric patterns, letters, words, numbers, logos, drawings, portraits and combinations thereof.

13. The method according to claim 9, wherein the step b) of applying the top coating composition is carried out by an inkjet printing process.

* * * * *